United States Patent
Ishii et al.

(10) Patent No.: US 11,243,310 B2
(45) Date of Patent: Feb. 8, 2022

(54) SOLID-STATE IMAGING DEVICE, SOLID-STATE IMAGING SYSTEM, AND METHOD OF DRIVING THE SOLID-STATE IMAGING DEVICE

(71) Applicant: Panasonic Intellectual Property Management Co., Ltd., Osaka (JP)

(72) Inventors: Motonori Ishii, Osaka (JP); Masato Takemoto, Osaka (JP); Shigeru Saitou, Kyoto (JP); Shinzo Koyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/029,601

(22) Filed: Sep. 23, 2020

(65) Prior Publication Data

US 2021/0011167 A1    Jan. 14, 2021

Related U.S. Application Data

(63) Continuation of application No. PCT/JP2018/013006, filed on Mar. 28, 2018.

(51) Int. Cl.
*G01S 17/89* (2020.01)
*G01S 7/4865* (2020.01)
(Continued)

(52) U.S. Cl.
CPC ........... *G01S 17/89* (2013.01); *G01S 7/4865* (2013.01); *H04N 5/3535* (2013.01); *H04N 5/37452* (2013.01)

(58) Field of Classification Search
CPC ..... G01S 17/89; G01S 7/4865; H04N 5/3535; H04N 5/37452
(Continued)

(56) References Cited

U.S. PATENT DOCUMENTS

2008/0002043 A1* 1/2008 Inoue ................... H04N 5/232
   348/296
2015/0144790 A1    5/2015 Velichko et al.
(Continued)

FOREIGN PATENT DOCUMENTS

| JP | 2014-179678 A | 9/2014 |
|---|---|---|
| JP | 2015-201733 A | 11/2015 |
| WO | 2017/098725 A1 | 6/2017 |

OTHER PUBLICATIONS

International Search Report dated Jun. 19, 2018, issued in counterpart International Application No. PCT/JP2018/013006, with English Translation. (5 pages).

*Primary Examiner* — Jeffery A Williams
(74) *Attorney, Agent, or Firm* — Westerman, Hattori, Daniels & Adrian, LLP

(57) ABSTRACT

Each of column signal lines is connected to two or more of P pixels belonging to one of Q pixel columns of pixels. In each of the pixels, a first switch switches connection and disconnection between a light receiver and a first charge storage. A second switch switches connection and disconnection between the first charge storage and a second charge storage. A third switch switches connection and disconnection between the first charge storage and one of column signal lines corresponding to the pixel. The fourth switch switches the connection and disconnection between the second charge storage and the one of the column signal lines corresponding to the pixel.

10 Claims, 15 Drawing Sheets

(51) Int. Cl.
*H04N 5/30*     (2006.01)
*H04N 5/00*     (2011.01)
*H04N 5/353*    (2011.01)
*H04N 5/3745*   (2011.01)

(58) Field of Classification Search
USPC .......................................................... 348/135
See application file for complete search history.

(56)          References Cited

U.S. PATENT DOCUMENTS

2015/0285618 A1   10/2015   Haraguchi
2018/0246214 A1    8/2018   Ishii et al.

* cited by examiner

FIG.6

| PERIOD (K) | SIGNAL LIGHT (M) | FIRST EXPOSURE AND TRANSFER OPERATION | | | SECOND EXPOSURE AND TRANSFER OPERATION | | |
|---|---|---|---|---|---|---|---|
| | | PERFORMED | FIRST DISTANCE SECTION (α) | TRANSFER DESTINATION | PERFORMED | SECOND DISTANCE SECTION (β) | TRANSFER DESTINATION |
| 1 | 1 | Y | 1 | SECOND PIXEL | Y | 8 | FIRST PIXEL |
| 1 | 2 | N | — | — | Y | 8 | FIRST PIXEL |
| 2 | 1 | Y | 2 | SECOND PIXEL | Y | 7 | FIRST PIXEL |
| 2 | 2 | N | — | — | Y | 7 | FIRST PIXEL |
| 3 | 1 | Y | 3 | SECOND PIXEL | Y | 6 | FIRST PIXEL |
| 3 | 2 | N | — | — | Y | 6 | FIRST PIXEL |
| 4 | 1 | Y | 4 | SECOND PIXEL | Y | 5 | FIRST PIXEL |
| 4 | 2 | N | — | — | Y | 5 | FIRST PIXEL |

FIG.14

| PERIOD (K) | SIGNAL LIGHT (M) | FIRST EXPOSURE AND TRANSFER OPERATION | | | SECOND EXPOSURE AND TRANSFER OPERATION | | |
|---|---|---|---|---|---|---|---|
| | | PERFORMED | FIRST DISTANCE SECTION ($\alpha$) | TRANSFER DESTINATION | PERFORMED | SECOND DISTANCE SECTION ($\beta$) | TRANSFER DESTINATION |
| 1 | 1 | Y | 1 | SECOND PIXEL | Y | 8 | FIRST PIXEL |
| 1 | 2 | Y | 2 | THIRD PIXEL | Y | 8 | FIRST PIXEL |
| 2 | 1 | Y | 3 | SECOND PIXEL | Y | 7 | FIRST PIXEL |
| 2 | 2 | Y | 4 | THIRD PIXEL | Y | 7 | FIRST PIXEL |
| 3 | 1 | Y | 5 | SECOND PIXEL | Y | 6 | FIRST PIXEL |
| 3 | 2 | Y | — | — | Y | 6 | FIRST PIXEL |

SOLID-STATE IMAGING DEVICE, SOLID-STATE IMAGING SYSTEM, AND METHOD OF DRIVING THE SOLID-STATE IMAGING DEVICE

CROSS-REFERENCE TO RELATED APPLICATIONS

This is a continuation of International Application No. PCT/JP2018/013006 filed on Mar. 28, 2018, the entire disclosure of which is incorporated by reference herein.

BACKGROUND

Disclosed herein is a solid-state imaging technique.

Solid-state imaging devices capable of photon counting in addition to subject imaging have been developed. Utilizing photon counting, it is possible to perform, for example, a distance measurement method of time of flight (TOF).

PCT International Publication No. WO 2017/098725 discloses a solid-state imaging device obtained by two-dimensionally arranging pixels, in a first pixel group, each including an q. Each pixel in this first pixel group includes a light receiving circuit, a counter circuit, a comparison circuit, and a storage circuit. The light receiving circuit includes a light receiving element for photoelectric conversion of converting received light into electrical signals. Based on a photoelectric time for the photoelectric conversion at the light receiving element, the light receiving circuit sets exposure signals and outputs light reception signals in accordance with the presence/absence of incident light that has reached the pixel within the photoelectric time. The counter circuit counts, as a count value, the number of arrivals of the incident light based on the light reception signals input from the light receiving circuit. The comparison circuit sets, as a threshold, a value corresponding to the count value and turns on a comparison signal where the count value is greater than the threshold. The storage circuit receives the comparison signal and a time signal variable over time and stores the time signal as a distance signal when the comparison signal is on.

SUMMARY

It is conceivable in the solid-state imaging device according to PCT International Publication No. WO 2017/098725 to designate at least one of pixel rows of the pixels and drive the pixels belonging to the designated pixel row. In the solid-state imaging device according to PCT International Publication No. WO 2017/098725, however, while at least one of the pixel rows of the pixels is designated, the charge generated by the light receiving circuit (i.e., the light receiver) of each pixel belonging to the designated pixel row can be transferred only to the counter circuit of the pixel. It is thus difficult to improve the processing speed of the solid-state imaging device.

The technique disclosed herein is directed to a solid-state imaging device. This solid-state imaging device includes: pixels arranged in a matrix including P pixel rows and Q pixel columns; and column signal lines each corresponding to one of Q pixel columns of the pixels and connected to two or more of P pixels belonging to the one of the Q pixel columns. Each of the pixels includes: a light receiver switchable between an exposure mode and a light-shielding mode and configured to generate charge corresponding to light received in the exposure mode; a first charge storage configured to store the charge; a first switch configured to switch connection and disconnection between the light receiver and the first charge storage; a second charge storage configured to store the charge; a second switch configured to switch connection and disconnection between the first charge storage and the second charge storage; a third switch configured to switch connection and disconnection between the first charge storage and one of the column signal lines corresponding to the pixel; and a fourth switch configured to switch connection and disconnection between the second charge storage and the one of the column signal lines corresponding to the pixel.

The technique disclosed herein is directed to a method of driving a solid-state imaging device. This solid-state imaging device includes: pixels arranged in a matrix including P pixel rows and Q pixel columns; and column signal lines each corresponding to one of Q pixel columns of the pixels and connected to two or more of P pixels belonging to the one of the Q pixel columns. Each of the pixels includes: a light receiver switchable between an exposure mode and a light-shielding mode and configured to generate charge corresponding to light received in the exposure mode; a first charge storage configured to store the charge; a first switch configured to switch connection and disconnection between the light receiver and the first charge storage; a second charge storage configured to store the charge; a second switch configured to switch connection and disconnection between the first charge storage and the second charge storage; a third switch configured to switch connection and disconnection between the first charge storage and one of the column signal lines corresponding to the pixel; and a fourth switch configured to switch connection and disconnection between the second charge storage and the one of the column signal lines corresponding to the pixel. The method of driving this solid-state imaging device includes: designating at least one of the P pixel rows of the pixels; performing, in at least one of the Q pixel columns of the pixels, first exposure and transfer of driving the pixels to bring the light receiver of a first pixel, which is one of the P pixels belonging to the at least one of the Q pixel columns and belongs to the at least one of the P pixel rows designated in the designating, into the exposure mode in the first exposure period, transfer the charge generated by the light receiver of the first pixel through the first switch, the first charge storage, and the third switch of the first pixel to one of the column signal lines connected to the first pixel, and further transfer the charge transferred to the one of the column signal lines through the fourth switch of a second pixel, which is one of the P pixels belonging to the at least one of the Q pixel columns and is connected together with the first pixel to the one of the column signal lines, to the second charge storage of the second pixel; and performing, in at least one of the Q pixel columns of the pixels, second exposure and transfer of driving the pixels to bring the light receiver of the first pixel into the exposure mode in the second exposure period and transfer the charge generated by the light receiver of the first pixel through the first switch, the first charge storage, and the second switch of the first pixel to the second charge storage of the first pixel.

According to the technology disclosed herein, at least one of the P pixel rows of the pixels is designated. During the period, in the at least one of the Q pixel columns of the pixels, charge is generated by the light receiver of a pixel (hereinafter referred to as a "first pixel") belonging to the designated pixel row out of the P pixels constituting the pixel column. The charge is transferred not only to the second charge storage of the first pixel but also to the second charge storage of a pixel (i.e., a pixel belonging to another pixel row) which is one of the P pixels belonging to the pixel column and is connected together with the first pixel to the column signal line. This configuration makes it possible to improve the processing speed of the solid-state imaging device.

BRIEF DESCRIPTION OF THE DRAWINGS

FIG. 6 is a table illustrating setting of exposure and transfer processing.

FIG. 14 is a table illustrating setting of exposure and transfer processing in distance detection control according to the variation.

DETAILED DESCRIPTION

Figure 1:
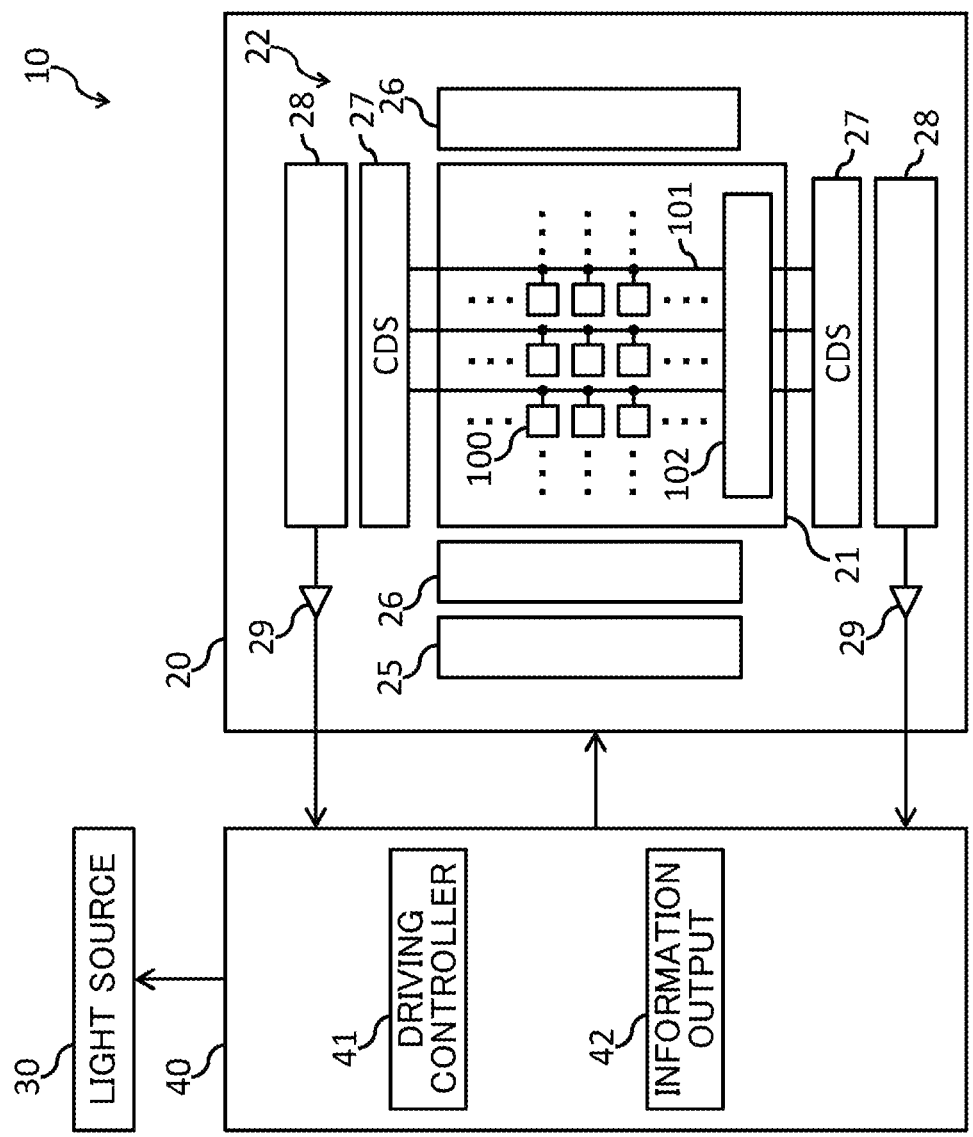
FIG. 1 is a block diagram illustrating a configuration of a solid-state imaging system.

Now, an embodiment will be described in detail with reference to the drawings. The same reference characters are used to represent equivalent elements, and redundant explanation will be omitted.

(Solid-State Imaging System)

FIG. 1 illustrates a configuration of a solid-state imaging system 10 according to the embodiment. The solid-state imaging system 10 performs distance measurement utilizing field imaging and photon counting. Specifically, the system includes a solid-state imaging device 20, a light source 30, and a controller 40. The solid-state imaging device 20 includes a pixel region 21 and a driving processor 22.

[Pixel Region]

The pixel region 21 includes pixels 100, column signal lines 101, and a column signal line driver 102. The pixels 100 are arranged in a matrix including P pixel rows and Q pixel columns. Each of the column signal lines 101 corresponds to one of Q pixel columns of the pixels 100. Two or more of P pixels 100 belonging to the pixel column are connected together. In this example, each of the Q pixel columns of the pixels 100 corresponds to one of the column signal lines 101. That is, Q column signal lines 101 are provided to correspond to the Q pixel columns of the pixels 100, respectively. Then, each of the Q column signal lines 101 is connected to P pixels 100 belonging to the pixel column corresponding to the column signal line.

[Pixel]

Figure 2:
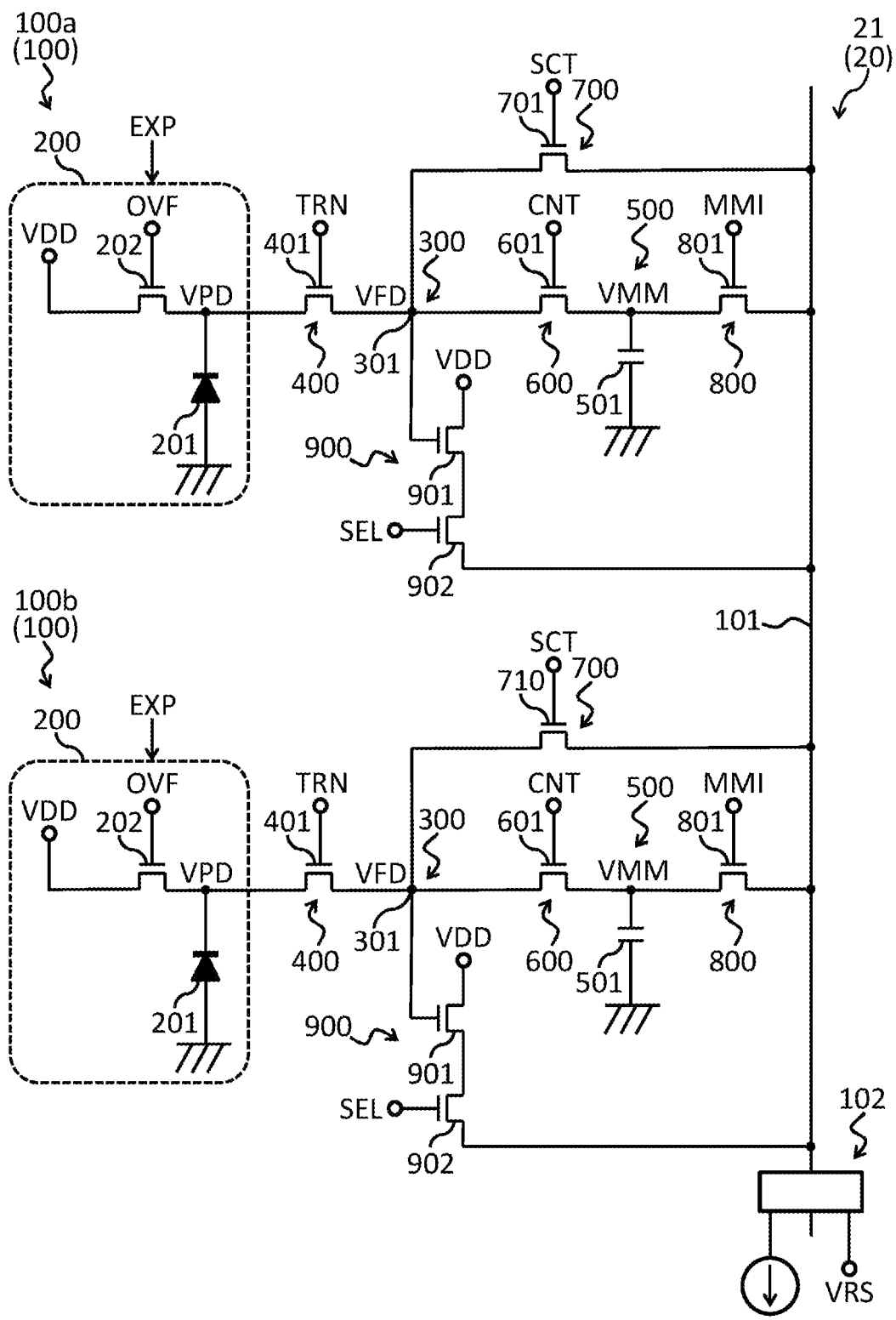
FIG. 2 is a circuit diagram illustrating a configuration of a main part of the solid-state imaging device.

As shown in FIG. 2, each of the pixels 100 includes a light receiver 200, a first charge storage 300, a first switch 400, a second charge storage 500, a second switch 600, a third switch 700, a fourth switch 800, and an output 900.

<Light Receiver>

The light receiver 200 is switchable between an exposure mode and a light-shielding mode. The light receiver 200 generates charge corresponding to the light received in the exposure mode. In the light-shielding mode, the light receiver 200 generates no charge. In this example, the light receiver 200 is switched between the exposure mode and the light-shielding mode in response to an exposure signal EXP.

Specifically, in this example, the light receiver 200 includes a photoelectric conversion element 201. In the light receiver 200, the photoelectric conversion element 201 is exposed to light in the exposure mode and the photoelectric conversion element 201 is shielded from light in the light-shielding mode. For example, the light receiver 200 includes an exposure mechanism (not shown) for exposing and shielding the photoelectric conversion element to and from light.

In this example, the photoelectric conversion element 201 is an avalanche photodiode. The photoelectric conversion element 201 is not limited thereto and may be any other type of photodiode.

In this example, the light receiver 200 includes a charge control transistor 202. The charge control transistor 202 is connected between the photoelectric conversion element 201 and a power supply node to which a power supply voltage is applied. The charge control transistor 202 has a gate connected to a charge control node to which a charge control signal OVF is applied. In response to the charge control signal OVF, the charge control transistor 202 is turned on and off.

In the following description, the potential of the light receiver 200 (i.e., the potential of the photoelectric conversion element 201 in this example) will be referred to as an "input potential VPD".

<First Charge Storage>

The first charge storage 300 stores charge. In this example, the first charge storage 300 has a floating diffusion 301.

In the following description, the potential of the first charge storage 300 (i.e., the potential of the floating diffusion 301 in this example) will be referred to as an "intermediate potential VFD".

<First Switch>

The first switch 400 switches the connection and disconnection between the light receiver 200 and the first charge storage 300. Once the first switch 400 connects the light receiver 200 to the first charge storage 300, charge is transferred between the light receiver 200 and the first charge storage 300. Once the first switch 400 disconnects the light receiver 200 from the first charge storage 300, no charge is transferred between the light receiver 200 and the first charge storage 300. In this example, the first switch 400 switches the connection and disconnection between the light receiver 200 and the first charge storage 300 in response to a first switching control signal TRN. Specifically, in this example, the first switch 400 includes a first switching transistor 401.

The first switching transistor 401 is connected between the photoelectric conversion element 201 of the light receiver 200 and the floating diffusion 301 of the first charge storage 300. The first switching transistor 401 has a gate connected to a first switching control node to which the first switching control signal TRN is applied. In response to the first switching control signal TRN, the first switching transistor 401 is turned on and off <Second Charge Storage>

The second charge storage 500 stores charge. In this example, the second charge storage 500 includes a charge storage capacitor 501.

In the following description, the potential of the second charge storage 500 (i.e., the potential at one end of the charge storage capacitor 501 in this example) will be referred to as a "memory potential VMM".

<Second Switch>

The second switch 600 switches the connection and disconnection between the first charge storage 300 and the second charge storage 500. Once the second switch 600 connects the first charge storage 300 to the second charge storage 500, charge is transferred between the first charge storage 300 and the second charge storage 500. Once the second switch 600 disconnects the first charge storage 300 from the second charge storage 500, no charge is transferred between the first charge storage 300 and the second charge storage 500. In this example, the second switch 600 switches the connection and disconnection between the first charge storage 300 and the second charge storage 500 in response to a second switching control signal CNT. Specifically, in this example, the second switch 600 includes a second switching transistor 601.

The second switching transistor 601 is connected between the floating diffusion 301 of the first charge storage 300 and the one end of the charge storage capacitor 501 of the second charge storage 500. The second switching transistor 601 has a gate connected to a second switching control node to which the second switching control signal CNT is applied. In response to the second switching control signal CNT, the second switching transistor 601 is turned on and off.

<Third Switch>

The third switch 700 switches the connection and disconnection between the first charge storage 300 and one of the column signal lines 101 corresponding to a pixel 100 (i.e., the pixel 100 including this third switch 700). Once the third switch 700 connects the first charge storage 300 to the column signal line 101, charge is transferred between the first charge storage 300 and the column signal line 101. Once the third switch 700 disconnects the first charge storage 300 from the column signal line 101, no charge is transferred between the first charge storage 300 and the column signal line 101. In this example, the third switch 700 switches the connection and disconnection between the first charge storage 300 and the column signal line 101 in response to a third switching control signal SCT. Specifically, in this example, the third switch 700 includes a third switching transistor 701.

The third switching transistor 701 is connected between the floating diffusion 301 of the first charge storage 300 and the column signal line 101. The third switching transistor 701 has a gate connected to a third switching control node to which the third switching control signal SCT is applied. In response to the third switching control signal SCT, the third switching transistor 701 is turned on and off <Fourth Switch>

The fourth switch 800 switches the connection and disconnection between the second charge storage 500 and one of the column signal lines 101 corresponding to a pixel 100 (i.e., the pixel 100 including this fourth switch 800). Once the fourth switch 800 connects the second charge storage 500 to the column signal line 101, charge is transferred between the second charge storage 500 and the column signal line 101. Once the fourth switch 800 disconnects the second charge storage 500 from the column signal line 101, no charge is transferred between the second charge storage 500 and the column signal line 101. In this example, the fourth switch 800 switches the connection and disconnection between the second charge storage 500 and the column signal line 101 in response to a fourth switching control signal MMI. Specifically, in this example, the fourth switch 800 includes a fourth switching transistor 801.

The fourth switching transistor 801 is connected between the one end of the charge storage capacitor 501 of the second charge storage 500 and the column signal line 101. The fourth switching transistor 801 has a gate connected to a fourth switching control node to which the fourth switching control signal MMI is applied. In response to the fourth switching control signal MMI, the fourth switching transistor 801 is turned on and off <Output>

The output 900 outputs signals corresponding to the charge stored in the first charge storage 300. In this example, the output 900 outputs each of the signals corresponding to the charge stored in the first charge storage 300 in response to a selection control signal SEL. Specifically, in this example, the output 900 includes an amplification transistor 901 and a selection transistor 902.

The amplification transistor 901 and the selection transistor 902 are connected in series between the power supply node to which a power supply voltage VDD is applied and the column signal line 101. The amplification transistor 901 has a gate connected to the floating diffusion 301 of the first charge storage 300. The selection transistor 902 has a gate connected to a selection control node to which the selection control signal SEL is applied. In response to the selection control signal SEL, the selection transistor 902 is turned on and off

[Column Signal Line Driver]

The column signal line driver 102 switches each of the column signal lines 101 among a reset mode, a read mode, and a float mode. In the reset mode, the column signal line 101 is connected to a reset voltage node to which a reset voltage VRS is applied. The reset voltage VRS is then applied to the column signal line 101. In the read mode, the column signal line 101 is connected to a reader (i.e., one of correlated double sampling circuits 27 in this example). In the float mode, the column signal line 101 is electrically disconnected from both of the reset voltage node and the reader.

[Driving Processor]

Referring back to FIG. 1, the driving processor 22 drives the pixels 100. In this example, the driving processor 22 drives each of the pixels 100 by supplying the exposure signal EXP, the charge control signal OVF, the selection control signal SEL, the first switching control signal TRN, the second switching control signal CNT, the third switching control signal SCT, and the fourth switching control signal MMI to the pixel 100.

In this example, the driving processor 22 performs a photon counting operation and an imaging operation in response to the control by the controller 40.

In the photon counting operation, the driving processor 22 drives the pixels 100 to designate at least one of the P pixel rows of the pixels 100 and perform each of first and second exposure and transfer operations at least once in at least one of the Q pixel columns of the pixels 100.

In the first exposure and transfer operation, the light receiver 200 of a pixel (hereinafter referred to as a "first pixel 100*a* ") shifts to the exposure mode in a first exposure period. The pixel is one of the P pixels 100 belonging to the pixel column and belongs to the designated pixel row. The charge generated by the light receiver 200 of the first pixel 100a is transferred through the first switch 400, the first charge storage 300, and the third switch 700 of the first pixel 100a to one of the column signal lines 101 connected to the first pixel 100a. The charge transferred to the column signal line 101 is further transferred through the fourth switch 800 of another pixel (hereinafter referred to as a "second pixel 100b") to the second charge storage 500 of the second pixel 100b. The pixel is one of the P pixels 100 belonging to the pixel column (i.e., the pixel column to which the first pixel 100a belongs) and is connected together with the first pixel 100a to the column signal line 101.

In the second exposure and transfer operation, the light receiver 200 of the first pixel 100a shifts to the exposure mode in a second exposure period. The charge generated by the light receiver 200 of the first pixel 100a is transferred through the first switch 400, the first charge storage 300, and the second switch 600 of the first pixel 100a to the second charge storage 500 of the first pixel 100a.

In the imaging operation, the driving processor 22 drives each of the pixels 100 to transfer the charge generated by the light receiver 200 through the first switch 400 to the first charge storage 300 and causes the output 900 to output a signal corresponding to the charge stored in the first charge storage 300.

Specifically, in this example, the driving processor 22 includes a pixel drive circuit 25, vertical shift registers 26, the correlated double sampling circuits 27, horizontal shift registers 28, and output circuits 29.

<Pixel Drive Circuit>

The pixel drive circuit 25 supplies, to each of the pixels 100, the exposure signal EXP, the charge control signal OVF, the first switching control signal TRN, the second switching control signal CNT, the third switching control signal SCT, and the fourth switching control signal MMI in response to the control by the controller 40.

<Vertical Shift Register>

Each vertical shift register 26 supplies the selection control signal SEL to each of the pixels 100 in response to the control by the controller 40. Then, the vertical shift register 26 sequentially selects one of the P pixel rows of the pixels 100. In this example, the vertical shift register 26 changes the signal level of the selection control signal SEL supplied to each of the Q pixels 100 included in the selected one of the P pixel rows of the pixels 100 from low to high.

In the pixel 100 selected by the vertical shift register 26, the output 900 outputs a signal corresponding to the charge stored in the first charge storage 300 to the column signal line 101 (i.e., the column signal line 101 corresponding to the pixel 100). That is, the vertical shift register 26 selects any one of the P pixel rows of the pixels 100 to output the signals from the outputs 900 of the Q pixels 100 included in the pixel row to the Q column signal lines 101.

In this example, two vertical shift registers 26 are provided. One and the other of the two vertical shift registers 26 alternately select one of the pixel rows.

<Correlated Double Sampling Circuit>

Each correlated double sampling circuit 27 performs correlated double sampling processing on each of the Q signals output to the Q column signal lines 101. Specifically, the correlated double sampling circuit 27 samples the signal levels of the signals output to the column signal lines 101 in signal and reset periods, which will be described later. The circuit outputs then signals corresponding to the differences between the signal levels. The correlated double sampling processing performed in this manner removes offset components from the Q signals.

In this example, two correlated double sampling circuits 27 are provided. Q signals output from the pixel row selected by one of the two vertical shift registers 26 to the Q column signal lines 101 are supplied to one of the correlated double sampling circuits 27. Q signals output from the pixel row selected by the other vertical shift register 26 to the Q column signal lines 101 are supplied to the other correlated double sampling circuit 27.

<Horizontal Shift Register>

Each horizontal shift register 28 sequentially transfers the Q signals processed in one of the correlated double sampling circuits 27. In this example, two horizontal shift registers 28 are provided. The Q signals processed in one of the two correlated double sampling circuits 27 are sequentially transferred by one of the horizontal shift registers 28. The Q signals processed in the other correlated double sampling circuit 27 are sequentially transferred by the other horizontal shift register 28.

<Output Circuit>

Each output circuit 29 amplifies the signals transferred by one of the horizontal shift registers 28 with a predetermined amplification gain and outputs the signals thus amplified. In this example, two output circuits 29 are provided. Signals are transferred from one of the two horizontal shift registers 28 to one of the output circuits 29. Signals are transferred from the other horizontal shift register 28 to the other output circuit 29.

[Light Source]

The light source 30 emits signal light LL1. In this example, the light source 30 emits the signal light LL1 (i.e., pulsed light) with a predetermined pulse width. For example, the light source 30 emits light to the entire region, whose three-dimensional information (i.e., distance information) is to be obtained, by diffusing the light as necessary. Note that the light source 30 may be a light emitting diode (LED), for example. The signal light LL1 has a pulse width of 10 ns, for example, and a peak intensity of 1 kW, for example.

In this example, the light source 30 is capable of emitting the signal light LL1 within an irradiation range in a line extending in a row direction of the pixels 100. In addition, the light source 30 can switch the irradiation range of the signal light LL1 in a column direction of the pixels 100.

Figure 3:
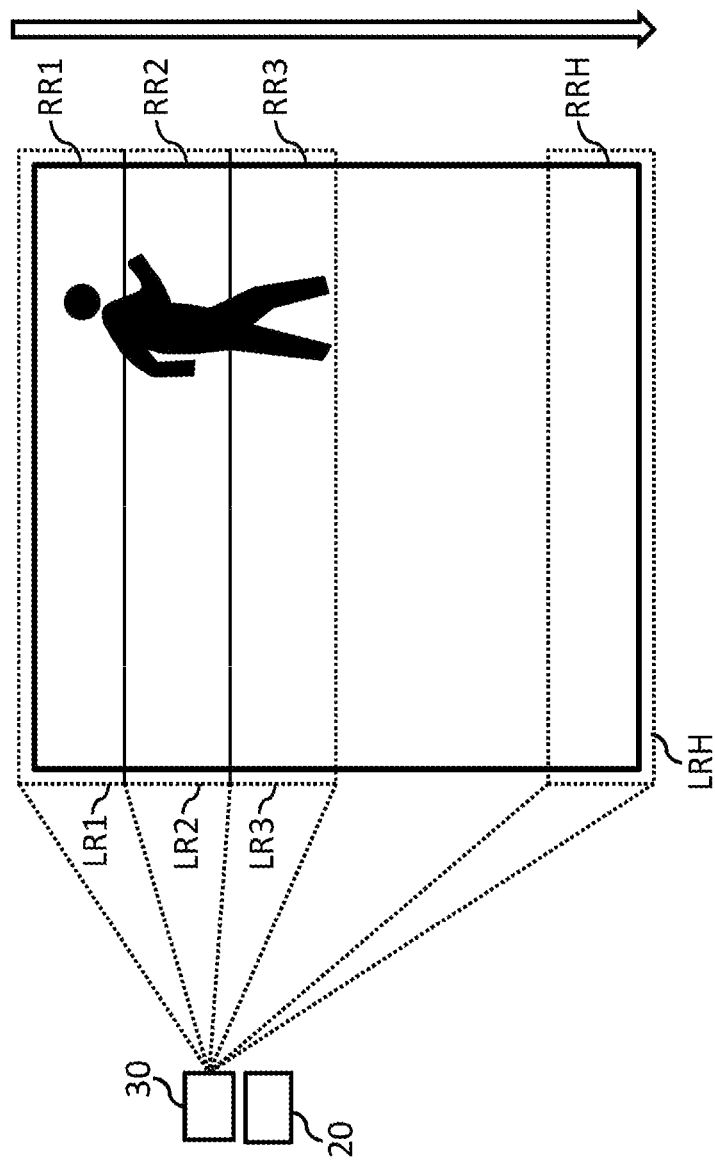
FIG. 3 is a conceptual diagram for explaining a light source.

Specifically, as shown in FIG. 3, the light source 30 can switch the irradiation range of the signal light LL1 at H stages, where H is an integer of two or more, namely irradiation ranges LR1 to LRH. The irradiation ranges LR1 to LRH at the H stages correspond to the H field areas RR1 to RRH, respectively. The H field areas RR1 to RRH are obtained by dividing the field imageable by the solid-state imaging device 20 into H along the columns (i.e., in the column direction of the columns of the pixels 100). In an L-th irradiation range, where L is an integer ranging from 1 to H, an L-th field area is irradiated.

In this example, the P pixel rows of the pixels 100 are classified into H pixel row units. That is, each of the H pixel row units includes at least one of the P pixel rows of the pixels 100. The H pixel row units of the pixels 100 correspond to the H field areas RR1 to RRH, respectively. Specifically, the L-th field area is imaged by the pixels 100 belonging to the L-th pixel row unit.

[Controller]

The controller 40 controls the operations of the solid-state imaging device 20 and the light source 30. For example, the controller 40 includes an arithmetic processor such as a CPU and a storage such as a memory that stores programs and information, for example, for causing the arithmetic processor to operate.

In this example, the driving controller 40 includes a driving controller 41 and an information output 42. That is, the driving controller 41 and the information output 42 fulfill some of the functions of the controller 40.

<Driving Controller>

The driving controller 41 controls the operations of the solid-state imaging device 20 and the light source 30. In this example, the driving controller 41 performs distance detection control and imaging control.

In the distance detection control, the driving controller 41 controls the operation of the solid-state imaging device 20 to designate at least one of the P pixel rows of the pixels 100 and cause the driving processor 22 to perform the photon counting operation in each of distance detection periods. In the distance detection control, the driving controller 41 controls the operations of the solid-state imaging device 20 and the light source 30 to perform continuous exposure and transfer operation at least once in the photon counting operation performed in each of the distance detection periods.

In the continuous exposure and transfer operation, the light source 30 emits the signal light LL1. After the lapse of a first delay time TA, which corresponds to a first distance section, since the emission of the signal light LL1 from the light source 30, one (e.g., a first exposure and transfer operation in this example) of first and second exposure and transfer operations is performed. Then, after the lapse of a second delay time TB, which corresponds to a second distance section, since the emission of the signal light LL1 from the light source 30, the other (e.g., the second exposure and transfer operation in this example) of the first and second exposure and transfer operations is performed.

Note that the second distance section is set farther from the solid-state imaging device 20 than the first distance section is. The second delay time TB is set longer than the first delay time TA. Note that the distance sections and the delay times will be described later in detail.

In the distance detection control, the driving controller 41 controls the operation of the light source 30 so that the field corresponding to the designated one of the P pixel rows of the pixels 100 (i.e., the field area imageable by the pixels 100 belonging to the designated pixel row) falls within the irradiation range of the signal light LL1. In this example, the driving controller 41 controls the operation of the light source 30 so that the irradiation range of the signal light LL1 is at the L-th (i.e., the irradiation range at the L-th stage corresponding to the designated L-th pixel row out of the H pixel rows of the pixels 100) of the H stages.

In the imaging control, the driving controller 41 causes the driving processor 22 to perform the imaging operation.

<Information Output>

The information output 42 outputs information (i.e., distance information) on the distance to an object based on signals obtained by the driving controller 41 in the distance detection control. In this example, the information output 42 outputs three-dimensional information (e.g., distance images) including P×Q distance values each being a value corresponding to the distance to the object.

[Distance Measurement Utilizing Photon Counting]

Next, the principle of the distance measurement utilizing the photon counting will be described with reference to FIG. 4. In this example, the photon counting is utilized for the distance measurement method of TOF.

First, the TOF distance measurement method will be described. In the TOF distance measurement method, the time period is measured from when light is emitted from a light source (i.e., the light source 30 in this example) around a distance measuring device (i.e., the solid-state imaging device 20 in this example) toward an object to when the light is reflected by the object and comes back to the distance measuring device. Based on the time period, the distance from the distance measuring device to the object is obtained.

Figure 4:
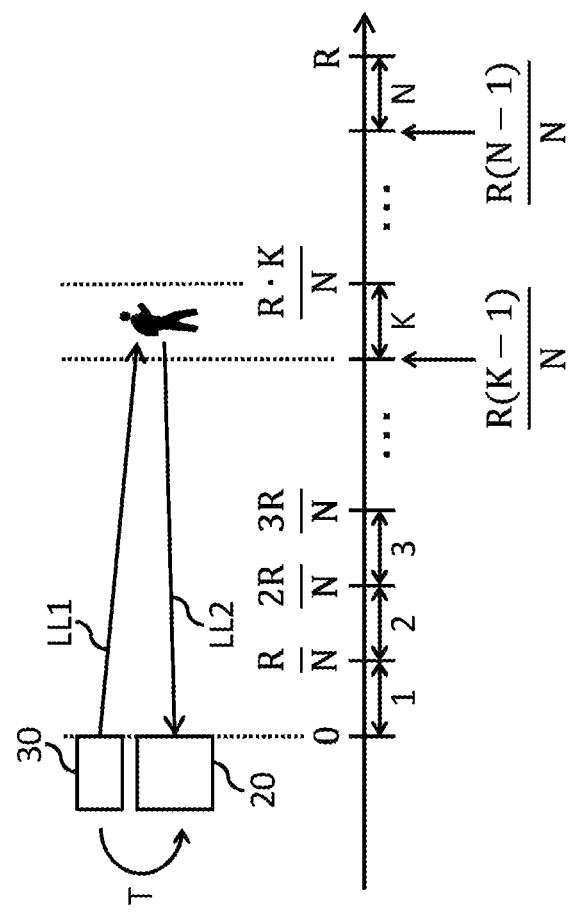
FIG. 4 is a conceptual diagram for explaining the principle of distance measurement.

As shown in FIG. 4, in this solid-state imaging system 10, a distance R (e.g., a distance measurable by the solid-state imaging system 10) which is a distance measurement range from the solid-state imaging device 20 to any point is divided into N distance sections. Specifically, a 1st distance section ranges from 0 to R/N. A 2nd distance section ranges from R/N to 2R/N. A 3rd distance section ranges from 2R/N to 3R/N. A distance section N ranges from R(N−1)/N to R. Here, assume that the object is present in a distance section K, where K is an integer ranging from 1 to N, out of the N distance sections. A time period T from when the signal light LL1 is emitted from the light source 30 until when the reflected light LL2 reaches the solid-state imaging device 20 is obtained in the following expression, where V is the speed of the light.

$$2(K-1)\frac{R}{N \cdot V} < T < 2 \cdot K \frac{R}{N \cdot V}$$

In the above expression, the time period T (i.e., a delay time TD) extends from the emission of the signal light LL1 from the light source 30 to the change in the light receiver 200 from the light-shielding mode to the exposure mode. This setting allows the light receiver 200 in the exposure mode to receive the reflected light LL2.

Based on such the principle, the delay time TD is set as in the following equation in each of the N distance sections in the solid-state imaging system 10.

$$TD = 2(K-1)\frac{R}{N \cdot V}$$

After the lapse of the delay time TD, which corresponds to a distance section K, since the emission of the signal light LL1 from the light source 30, the light receiver 200 changes from the light-shielding mode to the exposure mode. If the light receiver 200 in the exposure mode receives the reflected light LL2, the target is said to be present in the distance section K. Upon receipt of the reflected light LL2 in the exposure mode, the light receiver 200 generates the charge corresponding to the reflected light LL2. Then, the charge generated by the light receiver 200 is transferred through the first switch 400 and the second switch 600 to the second charge storage 500 and stored. Based on the amount of charge stored in the second charge storage 500, whether the object is present in the distance section K can be determined.

[Operation of Driving Controller: Distance Detection Control]

Figure 5:
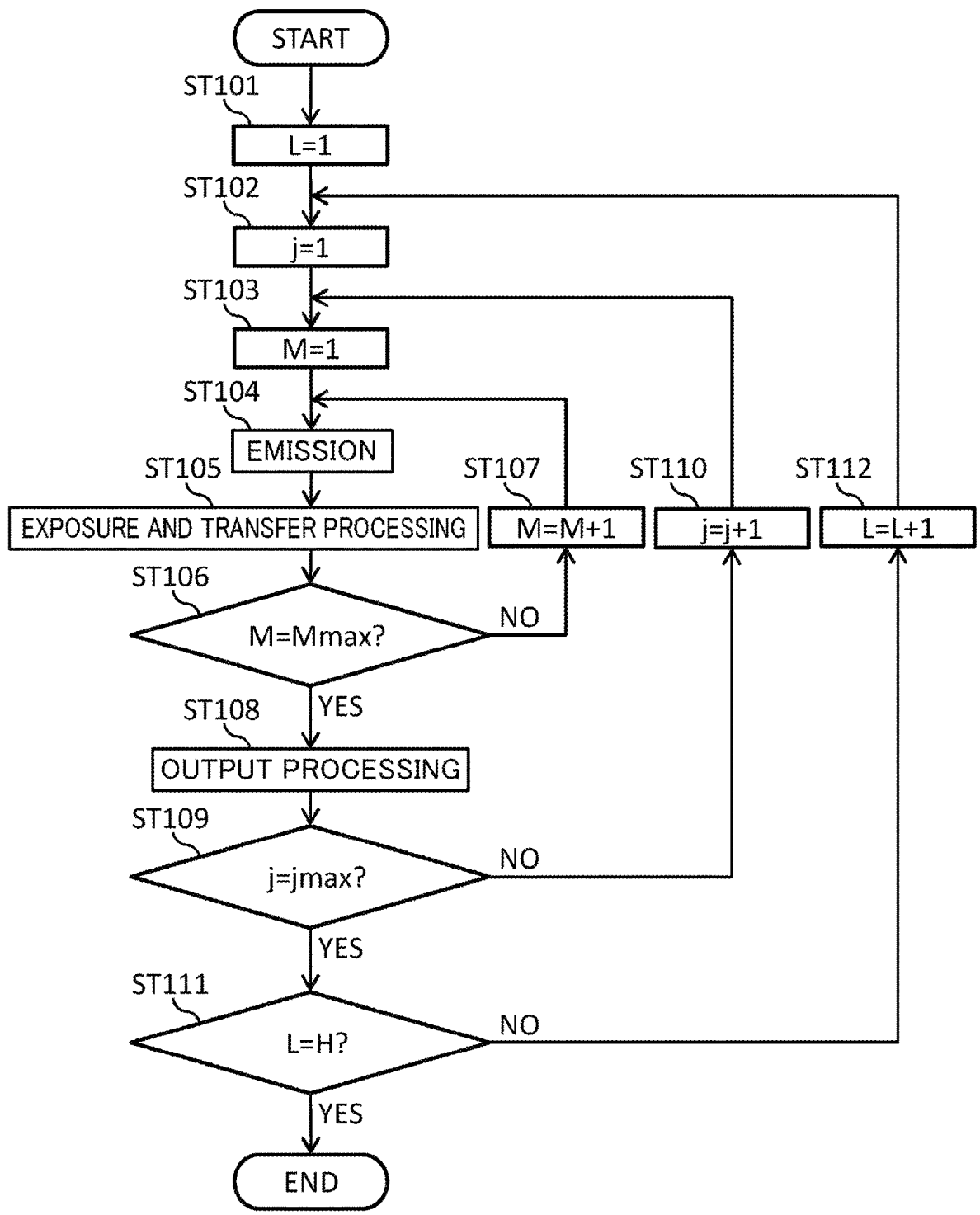
FIG. 5 is a flowchart for explaining distance detection control.

Next, the distance detection control by the driving controller 41 will be described with reference to FIG. 5. In this example, the H pixel row units of the pixels 100 are sequentially designated, and the driving processor 22 performs the photon counting operation in each of predetermined jmax distance detection periods, where jmax is an integer of two or more. The light source 30 emits Mmax rays of signal light LL1, where Mmax is an integer of 1 or more, in each of the jmax distance detection periods. That is, the signal light LL1 is emitted Mmax times in each of the jmax distance detection periods.

<Step ST101>

First, the driving controller 41 designates, as the processing target, a first pixel row unit out of the H pixel row units of the pixels 100. In this example, each of the H pixel row units includes one pixel row. That is, in this example, H is equal to P. The driving controller 41 designates any one (e.g., a first pixel row in step ST101) of the P pixel rows of the pixels 100. In the following description, the pixel row unit designated as the processing target will be referred to as an "L-th pixel row unit", where L is an integer ranging from 1 to H.

<Step ST102>

Next, the driving controller 41 selects, as the processing target, a first distance detection period out of the jmax distance detection periods. Accordingly, the first distance detection period starts. In the following description, the distance detection period selected as the processing target will be referred to as a "j-th distance detection period", where j is an integer ranging from 1 to j max.

Once the first distance detection period starts, the driving processor 22 drives the first pixel 100a and the second pixel 100b to reset the intermediate potential VFD and the memory potential VMM of each of the first pixel 100a and the second pixel 100b in response to the control by the driving controller 41.

<Step ST103>

Next, the driving controller 41 selects, as the target of the irradiation processing, the first signal light LL1 out of the Mmax signal light LL1 to be emitted in the j-th distance detection period. In the following description, the signal light LL1 selected as the target of the irradiation processing will be referred to as "j-th signal light LL1", where j is an integer ranging from 1 to Mmax.

<Step ST104>

Next, the light source 30 emits an M-th signal light LL1 in response to the control by the driving controller 41. Here, the light source 30 emits the M-th signal light LL1 within the L-th irradiation range corresponding to the L-th pixel row unit.

<Step ST105>

Next, the solid-state imaging device 20 performs the exposure and transfer processing. In the exposure and transfer processing, the first pixel 100a and the second pixel 100b are driven in each of the Q pixel columns of the pixels 100. The first pixel 100a is one the P pixels belonging to the pixel column and belongs to the L-th pixel row unit. The second pixel 100b is one of the P pixels belonging to the pixel column and is connected together with the first pixel 100a to the column signal line 101. The exposure and transfer processing will be described later in detail.

<Step ST106>

Next, the driving controller 41 determines whether all of the Mmax signal light LL1 to be emitted in the j-th distance detection period have been selected as the targets of the irradiation processing (i. e., whether the emission of the signal light LL1 at Mmax times has been completed). If all of the Mmax signal light LL1 to be emitted in the j-th distance detection period have not been selected as the target of the irradiation processing (i.e., if the answer is NO), the process proceeds to step ST107. If the answer is YES, the process proceeds to step ST108.

<Step ST107>

All of the Mmax signal light LL1 to be emitted in the j-th distance detection period are not selected as the targets of the irradiation processing. In this case, the driving controller 41 selects, as the next target of the irradiation processing, the signal light LL1 (i.e., the M+1-th signal light LL1) next to the M-th signal light LL1 out of the Mmax rays of the signal light LL1 to be emitted in the j-th distance detection period. Then, the process proceeds to step ST104.

Once the signal light LL1 is selected as the target of the next irradiation processing, the driving processor 22 drives the first pixel 100a and the second pixel 100b to rest the intermediate potential VFD of the first pixel 100a in response to the control by the driving controller 41.

<Step ST108>

On the other hand, in step ST106, all of the Mmax signal light LL1 to be emitted in the j-th distance detection period have been selected as the targets of the irradiation processing (i. e., the emission of the signal light LL1 at Mmax times has been completed). In this case, the solid-state imaging device 20 performs output processing. In output processing, the first pixel 100a and the second pixel 100b are driven in each of the Q pixel columns of the pixels 100. The first pixel 100a is one of the P pixels belonging to the pixel column and belongs to the L-th pixel row unit. The second pixel 100b is one of the P pixels belonging to the pixel column and is connected together with the first pixel 100a to the column signal line 101. The output processing will be described later in detail.

<Step ST109>

Next, the driving controller 41 determines whether all of the jmax distance detection periods have been selected as the processing targets. If all of the jmax distance detection periods are not selected as the processing targets (i.e., the answer is NO), the process proceeds to step ST110. If the answer is YES, the process proceeds to step ST111.

<Step ST110>

All of the jmax distance detection periods are not selected as the processing targets. In this case, the driving controller 41 selects, as the next processing target, the distance detection period (i.e., the j+1-th distance detection period) next to the j-th distance detection period out of the jmax distance detection periods. Accordingly, the next distance detection period starts. Then, the process proceeds to step ST103.

Once the next distance detection period starts, the driving processor 22 drives the first pixel 100a and the second pixel 100b to reset the intermediate potential VFD and the memory potential VMM of each of the first pixel 100a and the second pixel 100b in response to the control by the driving controller 41.

<Step ST111>

On the other hand, all of the jmax distance detection periods are designated as the processing targets in step S109. In this case, the driving controller 41 determines whether all of the H pixel row units have been designated as the processing targets. If all of the H pixel row units are not designated as the processing targets, the process proceeds to step ST112. If all of the H pixel row units are designated as the processing targets, the process ends.

<Step ST112>

If all of the H pixel row units are not designated as the processing targets, the driving controller 41 designates, as the next processing target, the pixel row unit (i.e., the L+1-th pixel row unit) next to the L-th pixel row unit out of the H pixel row units. Then, the process proceeds to step ST102.

[Exposure and Transfer Processing]

Next, the exposure and transfer processing will be described with reference to FIGS. 6 to 10. In the exposure and transfer processing, each of the first and second exposure and transfer operations is performed at least once. In addition, in the exposure and transfer processing, the continuous exposure and transfer operation is performed at least once in which one of the first and second exposure and transfer operations follows the other.

As shown in FIG. 6, in this example, set in advance for each of the combinations of the distance detection periods and the signal light LL1 are the presence/absence of the first and second exposure and transfer operations and the first and second distance sections associated with the first and second exposure and transfer operations, respectively. The first distance section is set to an α-th distance section, where α is an integer ranging from 1 to N, associated with the first exposure and transfer operation, out of the N distance sections. The second distance section is set to a β-th distance section, where β is an integer ranging from 1 to N and β>α in this example, associated with the second exposure and transfer operation, out of the N distance sections.

The first row of the example of FIG. 6 indicates the following. The first signal light LL1 in the first distance detection period is subjected to the first exposure and transfer operation. The first distance section associated with the first exposure and transfer operation is set to the 1st distance section. The second exposure and transfer operation is also performed. The second distance section associated with the second exposure and transfer operation is set to a distance section 8. On the other hand, the second row of the example of FIG. 6 indicates the following. The second signal light LL1 in the first distance detection period is subjected not to the first exposure and transfer operation but to the second exposure and transfer operation. The second distance section associated with the second exposure and transfer operation is set to the distance section 8.

Figure 7:
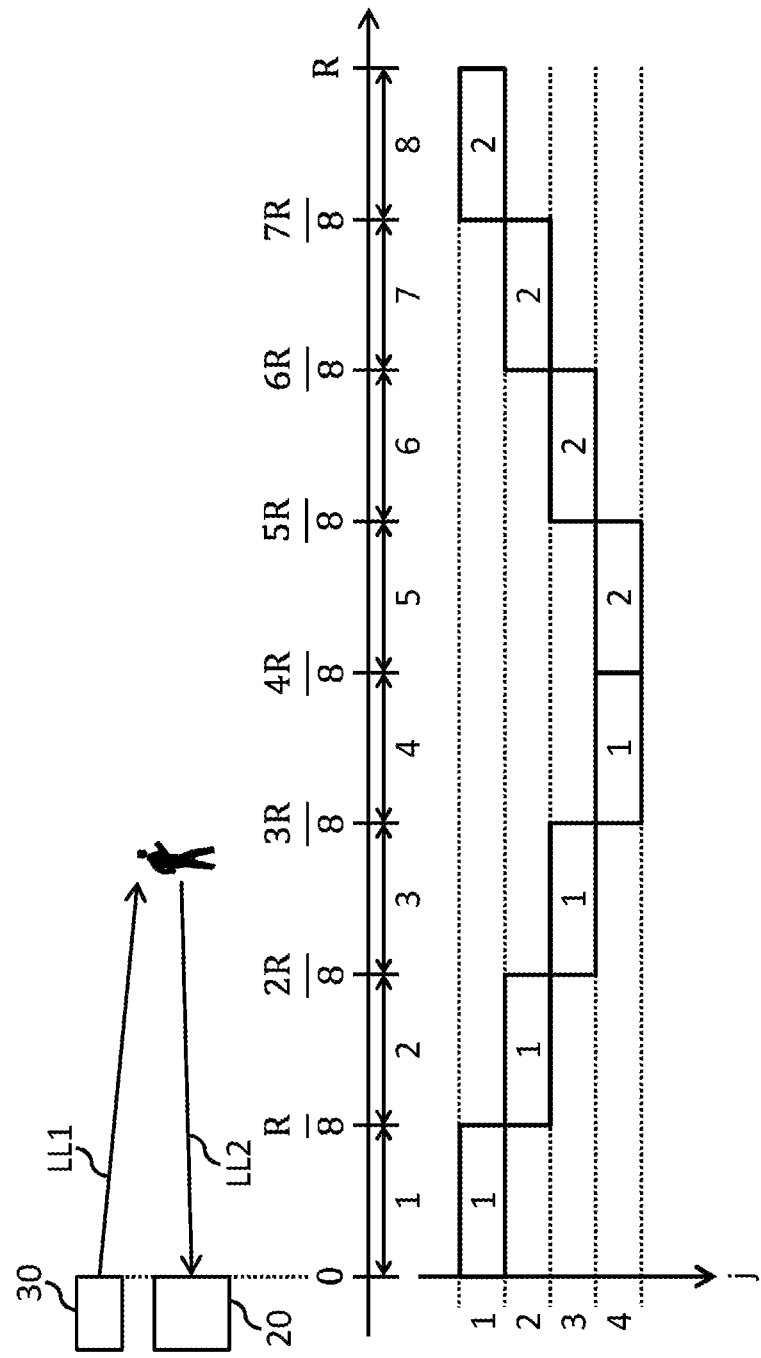
FIG. 7 is a conceptual diagram for explaining the distance detection control.

In the setting shown in the example of FIG. 6, the distance detection control is performed for two distance sections in each of four distance detection periods as shown in FIG. 7. For example, in the example of FIG. 7, in the first distance detection period, the first exposure and transfer operation is performed which is associated with the 1st distance section (i.e., the section from 0 to R/8 in the example of FIG. 7), whereas the second exposure and transfer operation is performed which is associated with the distance section 8 (i.e., the section from 7R/8 to R in the example of FIG. 7). In the second distance detection period, the first exposure and transfer operation is performed which is associated with the 2nd distance section (i.e., the section from R/8 to 2R/8 in the example of FIG. 7), whereas the second exposure and transfer operation is performed associated with a distance section 7 (i.e., the section from 6R/8 to 7R/8 in the example of FIG. 7).

Assume that the first distance section associated with the first exposure and transfer operation is set to the α-th distance section, where α is an integer ranging from 1 to N, out of the N distance sections. In this case, the first delay time TA (i.e., from the emission of the signal light LL1 from the light source 30 to the start of the first exposure and transfer operation) associated with the first exposure and transfer operation is set as in the following equation.

$$TA = 2(\alpha - 1)\frac{R}{N \cdot V}$$

Similarly, assume that the second distance section associated with the second exposure and transfer operation is set to the β-th distance section, where β is an integer ranging from 1 to N and β>α in this example, out of the N distance sections. In this case, the second delay time TB (i.e., from the emission of the signal light from the light source 30 to the start of the second exposure and transfer operation) associated with the second exposure and transfer operation is set as in the following equation.

$$TB = 2(\beta - 1)\frac{R}{N \cdot V}$$

Figure 8:
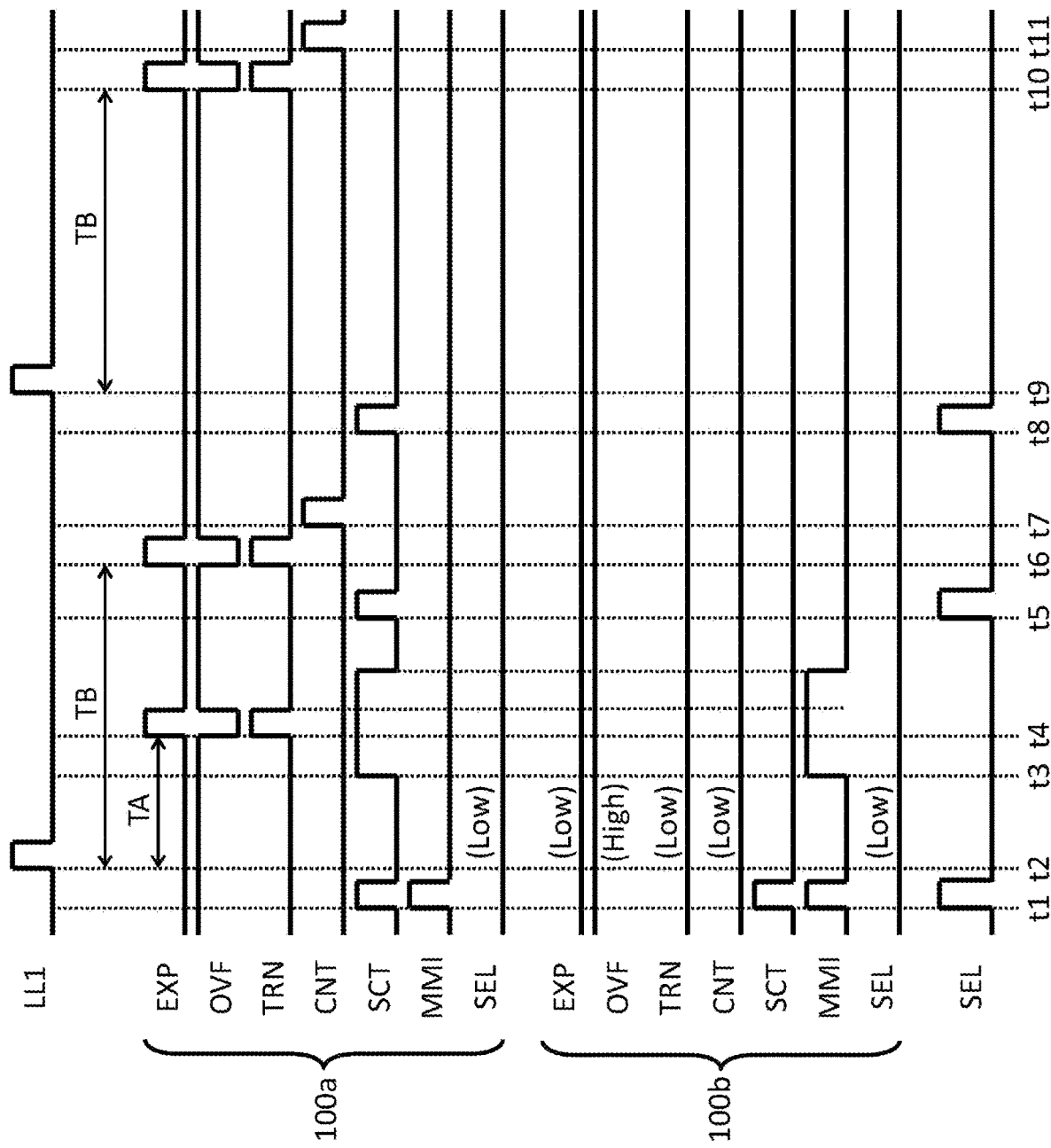
FIG. 8 is a timing diagram illustrating variations in signals in the exposure and transfer processing.
Figure 9:
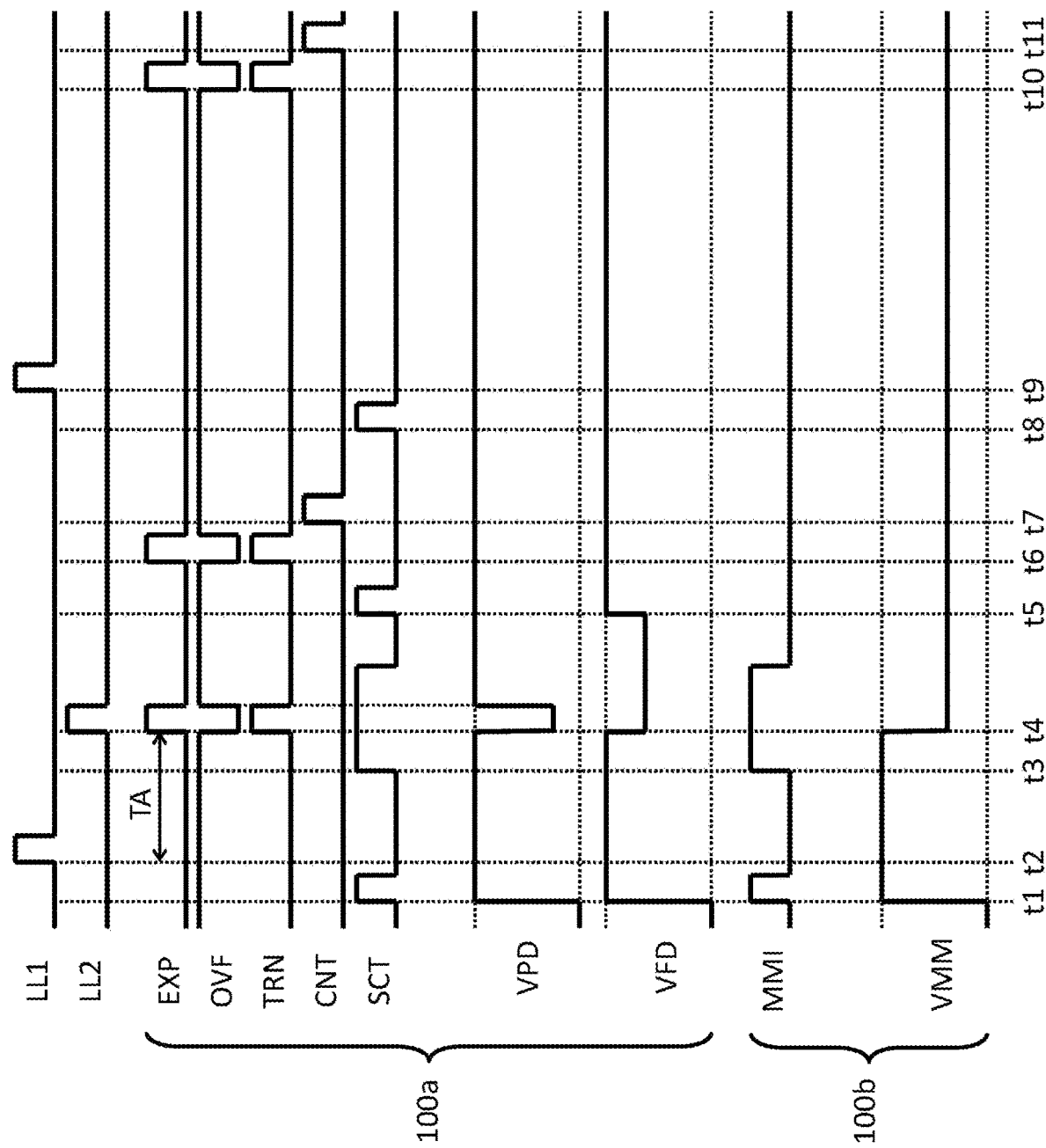
FIG. 9 is a timing diagram illustrating variations in potentials in the exposure and transfer processing.
Figure 10:
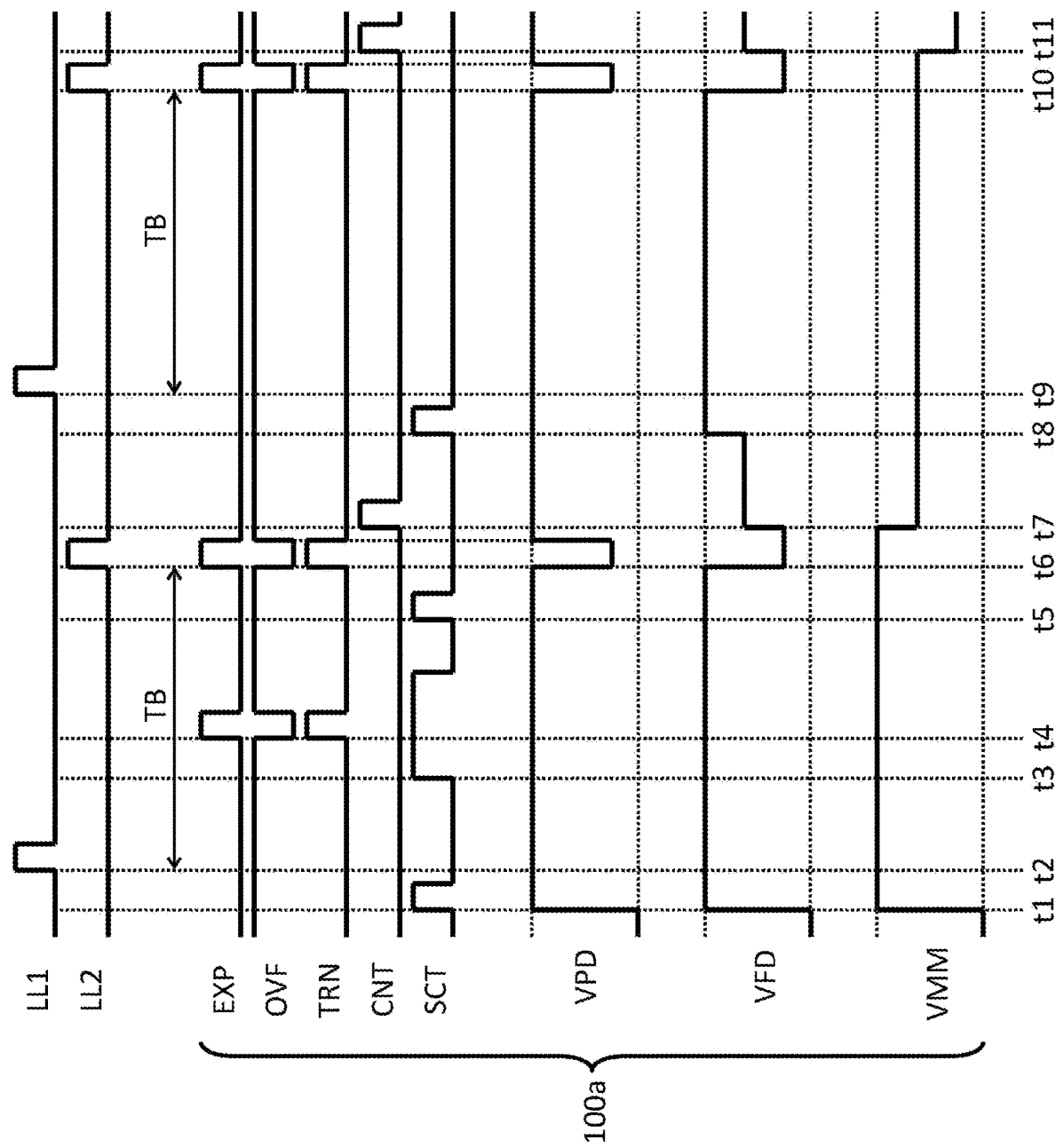
FIG. 10 is a timing diagram illustrating variations in potentials in the exposure and transfer processing.

Next, the exposure and transfer processing will be described in detail with reference to FIGS. 8 to 10. FIGS. 8 to 10 illustrate the following. The light source 30 emits two rays of signal light LL1 in the j-th of the jmax distance detection periods. The first signal light LL1 is subjected to both the first and second exposure and transfer operations. The second signal light LL1 is subjected to the second exposure and transfer operation (e.g., in the setting in the example of FIG. 6). FIG. 9 illustrates that the target is present in the first distance section associated with the first exposure and transfer operation. FIG. 10 illustrates that the object is present in the second distance section associated with the second exposure and transfer operation.

As shown at a time t1 in FIG. 8, once the first distance detection period starts, the intermediate potential VFD and the memory potential VMM of each of the first pixel 100a and the second pixel 100b are reset (step ST102).

Specifically, the pixel drive circuit 25 of the driving processor 22 changes the signal levels of the third and fourth switching control signals SCT and MMI supplied to each of the first pixel 100a and the second pixel 100b from low to high. Accordingly, the third and fourth switching transistors 701 and 801 are turned on in each of the first pixel 100a and the second pixel 100b. Then, the column signal line driver 102 brings the column signal line 101 connected to the first pixel 100a and the second pixel 100b into the reset mode (i.e., where the reset voltage VRS is applied).

Accordingly, the reset voltage VRS applied to the column signal line 101 is transmitted through the third and fourth switching transistors 701 and 801 being on of the first pixel 100a to the first charge storage 300 and the second charge storage 500 of the first pixel 100a. The intermediate potential VFD and the memory potential VMM of the first pixel 100a are reset as indicated by a time t1 in FIGS. 9 and 10.

Similarly, the reset voltage VRS applied to the column signal line 101 is transmitted through the second and third switching transistors 701 and 801 being on of the second pixel 100b to the first charge storage 300 and the second charge storage 500 of the second pixel 100b. The intermediate potential VFD and the memory potential VMM of the second pixel 100b are reset.

After completion of the reset of the intermediate potential VFD and the memory potential VMM (e.g., after the lapse of a predetermined reset time), the pixel drive circuit 25 changes the signal levels of the third and fourth switching control signals SCT and MMI supplied to the first pixel 100a from high to low. Accordingly, the third and fourth switching transistors 701 and 801 of the first pixel 100a are turned off. The pixel drive circuit 25 also changes the signal levels of the third and fourth switching control signals SCT and MMI supplied to the second pixel 100b from high to low. Accordingly, the third and fourth switching transistors 701 and 801 of the second pixel 100b are also turned off. Then, the column signal line driver 102 brings the column signal line connected to the first pixel 100a and the second pixel 100b into the float mode (i.e., where no reset voltage is applied and the reader is disconnected).

Next, as shown at a time t2 in FIG. 8, the light source 30 emits the first signal light LL1 in response to the control by the driving controller 41.

Next, as shown at times t3 and t4 in FIG. 8, after the lapse of the first delay time TA since the emission of the signal light LL1 from the light source 30, the first exposure and transfer operation is performed. In the first exposure and transfer operation, the light receiver 200 of the first pixel 100a shifts to the exposure mode in the first exposure period. The charge generated by the light receiver 200 of the first pixel 100a is transferred through the first switch 400, the first charge storage 300, and the third switch 700 of the first pixel 100a to the column signal line 101. The charge transferred to the column signal line 101 is further transferred through the fourth switch 800 of the second pixel 100b to the second charge storage 500 of the second pixel 100b.

Specifically, as shown at the time t3 in FIG. 8, the pixel drive circuit 25 of the driving processor 22 changes the signal levels of the third switching control signal SCT supplied to the first pixel 100a and the fourth switching control signal MMI supplied to the second pixel 100b from low to high. Accordingly, the third switching transistor 701 of the first pixel 100a connects the first charge storage 300 of the first pixel 100a to the column signal line 101, whereas the fourth switching transistor 801 of the second pixel 100b connects the second charge storage 500 of the second pixel 100b to the column signal line 101. As a result, the path is established from the first charge storage 300 of the first pixel 100a through the third switching transistor 701 being on of the first pixel 100a, the column signal line 101, and the fourth switching transistor 801 being on of the second pixel 100b to the second charge storage 500 of the second pixel 100b.

As shown at the time t4 in FIG. 8, after the lapse of the first delay time TA since the emission of the first signal light LL1 from the light source 30, the pixel drive circuit 25 of the driving processor 22 changes the signal level of the exposure signal EXP supplied to the first pixel 100a from low to high, and then the signal level of the charge control signal OVF from high to low. Accordingly, the charge control transistor 202 of the first pixel 100a is turned off and the light receiver 200 of the first pixel 100a shifts to the exposure mode and generates the charge corresponding to the light received by the light receiver 200 of the first pixel 100a. In accordance with the amount of the generated charge, the input potential VPD of the first pixel 100a changes as shown at a time t4 in FIG. 9.

Then, after the lapse of the first exposure period since the change in the signal level of the exposure signal EXP supplied to the first pixel 100a from low to high, the pixel drive circuit 25 changes the signal level of the exposure signal EXP supplied to the first pixel 100a from high to low, and then the signal level of the charge control signal OVF from low to high. Accordingly, the charge control transistor 202 of the first pixel 100a is turned on and the light receiver 200 of the first pixel 100a shifts to the light-shielding mode. Note that, in this example, the first exposure period has a length corresponding to the pulse width of the signal light LL1 (i.e., a length equivalent to the pulse width).

As shown at the time t4 in FIG. 8, the pixel drive circuit 25 of the driving processor 22 changes the signal level of the first switching control signal TRN of the first pixel 100a from low to high. Accordingly, the first switching transistor 401 of the first pixel 100a is turned on. Charge is then transferred from the light receiver 200 of the first pixel 100a through the first switching transistor 401 being on to the first charge storage 300. In accordance with the amount of the transferred charge, the intermediate potential VFD of the first pixel 100a changes. As shown at the time t2 in FIG. 8, the path is established from the first charge storage 300 of the first pixel 100a through the third switching transistor 701 being on of the first pixel 100a, the column signal line 101, and the fourth switching transistor 801 being on of the second pixel 100b to the second charge storage 500 of the second pixel 100b. Charge is thus transferred from the first charge storage 300 of the first pixel 100a through this path to the second charge storage 500 of the second pixel 100b. In accordance with the amount of the transferred charge, the memory potential VMM of the second pixel 100 changes as shown at a time t4 in FIG. 9. Note that the amount of the charge transferred from the first charge storage 300 of the first pixel 100a to the second charge storage 500 of the second pixel 100b corresponds to the ratio of the capacitance of the first charge storage 300 to the capacitance of the second charge storage 500.

After completion of the transfer from the first charge storage 300 of the first pixel 100a to the second charge storage 500 of the second pixel 100b (e.g., after the lapse of a predetermined transfer time), the pixel drive circuit 25 changes the signal level of the first switching control signal TRN supplied to the first pixel 100a from high to low. Accordingly, the first switching transistor 401 of the first pixel 100a is turned off. In addition, the pixel drive circuit 25 changes the signal levels of the third switching control signal SCT supplied to the first pixel 100a and the fourth switching control signal MMI supplied to the second pixel 100b from high to low. Accordingly, the third switching transistors 701 of the first pixel 100a and the fourth switching transistor 801 of the second pixel 100b are turned off As shown at a time t5 in FIG. 8, the pixel drive circuit 25 of the driving processor 22 changes the signal level of the third switching control signal SCT supplied to the first pixel 100a from low to high. Accordingly, the third switching transistor 701 of the first pixel 100a is turned on. Then, the column signal line driver 102 brings the column signal line 101 connected to the first pixel 100a into the reset mode (i.e., where the reset voltage VRS is applied). Accordingly, the reset voltage VRS applied to the column signal line 101 is transmitted through the third switching transistor 701 being on of the first pixel 100a to the first charge storage 300 of the first pixel 100a. As shown at a time t5 in FIG. 9, the intermediate potential VFD of the first pixel 100a is reset.

After completion of the reset of the intermediate potential VFD (e.g., after the lapse of a predetermined reset time), the pixel drive circuit 25 changes the signal level of the third switching control signal SCT supplied to the first pixel 100a from high to low. Accordingly, the third switching transistor 701 of the first pixel 100a is turned off. Then, the column signal line driver 102 brings the column signal line 101 connected to the first pixel 100a into the float mode (i.e., where no reset voltage is applied and the reader is disconnected).

Next, as shown at times t7 and t8 in FIG. 8, after the lapse of the second delay time TB since the emission of the signal light LL1 from the light source 30, the second exposure and transfer operation is performed. In the second exposure and transfer operation, the light receiver 200 of the first pixel 100a shifts to the exposure mode in the second exposure period. The charge generated by the light receiver 200 of the first pixel 100a is transferred through the first switch 400, the first charge storage 300, and the second switch 600 of the first pixel 100a to the second charge storage 500 of the first pixel 100a.

Specifically, as shown at a time t6 of FIG. 8, after the lapse of the second delay time TB since the emission of the first signal light LL1 from the light source 30, the pixel drive circuit 25 of the driving processor 22 changes the signal level of the exposure signal EXP supplied to the first pixel 100a from low to high, and then the signal level of the charge control signal OVF from high to low. Accordingly, the charge control transistor 202 of the first pixel 100a is turned off and the light receiver 200 of the first pixel 100a shifts to the exposure mode and generates the charge corresponding to the light received by the light receiver 200 of the first pixel 100a. In accordance with the amount of the generated charge, the input potential VPD of the first pixel 100a changes as shown at a time t6 in FIG. 10. Then, after the lapse of the second exposure period since the change in the signal level of the exposure signal EXP supplied to the first pixel 100a from low to high, the pixel drive circuit 25 changes the signal level of the exposure signal EXP supplied to the first pixel 100a from high to low and the signal level of the charge control signal OVF from low to high. Accordingly, the charge control transistor 202 of the first pixel 100a is turned on, whereas the light receiver 200 of the first pixel 100a shifts to the light-shielding mode. Note that, in this example, the second exposure period has a length corresponding to the pulse width of the signal light LL1 (i.e., a length equivalent to the pulse width).

As shown at the time t6 in FIG. 8, the pixel drive circuit 25 of the driving processor 22 changes the signal level of the first switching control signal TRN of the first pixel 100a from low to high. Accordingly, the first switching transistor 401 of the first pixel 100a is turned on. Charge is then transferred from the light receiver 200 of the first pixel 100a through the first switching transistor 401 being on to the first charge storage 300. In accordance with the amount of the transferred charge, the intermediate potential VFD of the first pixel 100a changes as shown at the time t6 in FIG. 10. After completion of the transfer of the charge from the light receiver 200 of the first pixel 100a to the first charge storage 300 (e.g., after the lapse of a predetermined transfer time), the pixel drive circuit 25 changes the signal level of the first switching control signal TRN from high to low. Accordingly, the first switching transistor 401 is turned off.

As shown at a time t7 in FIG. 8, the pixel drive circuit 25 of the driving processor 22 changes the signal level of the second switching control signal CNT supplied to the first pixel 100a from low to high. Accordingly, the second switching transistor 601 is turned on. Charge is then transferred from the first charge storage 300 through the second switching transistor 601 being on to the second charge storage 500. In accordance with the amount of the transferred charge, the memory potential VMM of the first pixel 100a changes as shown at a time t7 in FIG. 10. Note that the amount of the charge transferred from the first charge storage 300 to the second charge storage 500 corresponds to the ratio of the capacitance of the first charge storage 300 to the capacitance of the second charge storage 500. After completion of the transfer from the first charge storage 300 of the first pixel 100a to the second charge storage 500 (e.g., after the lapse of a predetermined transfer time), the pixel drive circuit 25 changes the signal level of the second switching control signal CNT from high to low. Accordingly, the second switching transistor 601 is turned off.

Next, as shown at the time t8 in FIG. 8, once the second signal light LL1 is selected as the next emission target, the intermediate potential VFD of the first pixel 100a is reset (step ST107). Specifically, the pixel drive circuit 25 of the driving processor 22 changes the signal level of the third switching control signal SCT supplied to the first pixel 100a from low to high. Accordingly, the third switching transistor 701 is turned on in the first pixel 100a. Then, the column signal line driver 102 brings the column signal line 101 connected to the first pixel 100a into the reset mode (i.e., where the reset voltage VRS is applied). Accordingly, the reset voltage VRS applied to the column signal line 101 is transmitted through the third switching transistor 701 being on of the first pixel 100a to the first charge storage 300 of the first pixel 100a. As shown at a time t8 in FIG. 10, the intermediate potential VFD of the first pixel 100a is then reset.

After completion of the reset of the intermediate potential VFD (e.g., after the lapse of a predetermined reset time), the pixel drive circuit 25 changes the signal level of the third switching control signal SCT supplied to the first pixel 100a from high to low. Accordingly, the third switching transistor 701 of the first pixel 100a is turned off. Then, the column signal line driver 102 bring the column signal line connected to the first pixel 100a into the float mode (i.e., where no reset voltage is applied and the reader is disconnected).

Next, at times t9, t10, and t11 in FIG. 8, the same operations as those at the times t2, t6, and t7 in FIG. 8 are performed. In this example, no first exposure and transfer operation is performed in the times t9 to t10.

[Output Processing]

The output processing will be described with reference to FIG. 11. In the output processing, the driving processor 22 drives the first pixel 100a and the second pixel 100b as follows in response to the control by the driving controller 41. The intermediate potential VFD is reset in each of the first pixel 100a and the second pixel 100b. Then, the charge stored in the second charge storage 500 is transferred through the second switch 600 to the first charge storage 300. The output 900 outputs a signal corresponding to the charge stored in the first charge storage 300.

Figure 11:
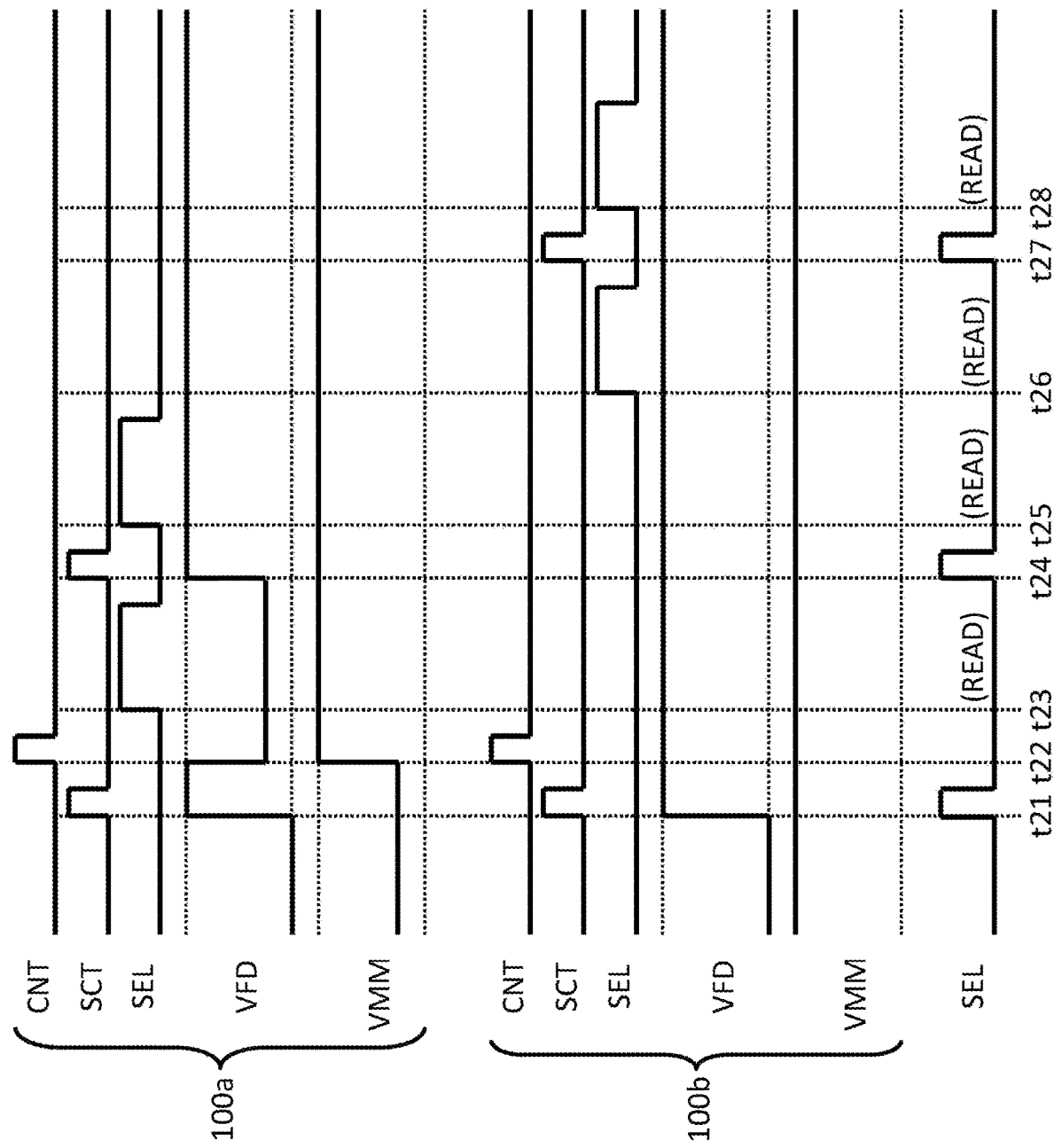
FIG. 11 is a timing diagram illustrating variations in signals in output processing.

Specifically, as shown at a time t21 in FIG. 11, the pixel drive circuit 25 of the driving processor 22 changes the signal level of the third switching control signal SCT supplied to each of the first pixel 100a and the second pixel 100b from low to high. Accordingly, the third switching transistor 701 is turned on in each of the first pixel 100a and the second pixel 100b. In addition, the column signal line driver 102 brings the column signal line 101 connected to the first pixel 100a and the second pixel 100b into the reset mode (i.e., where the reset voltage VRS is applied). Accordingly, the reset voltage VRS applied to the column signal line 101 is transmitted through the third switching transistor 701 being on of the first pixel 100a to the first charge storage 300 of the first pixel 100a. The intermediate potential VFD of the first pixel 100a is then reset. Similarly, the reset voltage VRS applied to the column signal line 101 is transmitted through the third switching transistor 701 being on of the second pixel 100b to the first charge storage 300 of the second pixel 100b. The intermediate potential VFD of the second pixel 100b is then reset. After completion of the reset of the intermediate potential VFD (e.g., after the lapse of a predetermined reset time), the pixel drive circuit 25 changes the signal level of the third switching control signal SCT supplied to each of the first pixel 100a and the second pixel 100b from high to low. Accordingly, the third switching transistor 701 is turned off in each of the first pixel 100a and the second pixel 100b. Then, the column signal line driver 102 brings the column signal line 101 connected to the first pixel 100a and the second pixel 100b into the read mode (i.e., where the reader is connected).

Next, as shown at a time t22 in FIG. 11, the pixel drive circuit 25 of the driving processor 22 changes the signal level of the second switching control signal CNT supplied to each of the first pixel 100a and the second pixel 100b from low to high. Accordingly, the second switching transistor 601 is turned on in each of the first pixel 100a and the second pixel 100b. Charge is then transferred from the second charge storage 500 through the second switching transistor 601 being on to the first charge storage 300. In accordance with the amount of transferred charge, the intermediate potential VFD changes. Note that the amount of the charge transferred from the second charge storage 500 to the first charge storage 300 corresponds to the ratio of the capacitance of the first charge storage 300 to the capacitance of the second charge storage 500. After completion of the transfer of the charge from the second charge storage 500 to the first charge storage 300 in each of the first pixel 100a and the second pixel 100b (e.g., after the lapse of a predetermined transfer time), the pixel drive circuit 25 changes the signal level of the second switching control signal CNT supplied to each of the first pixel 100a and the second pixel 100b from high to low. Accordingly, the second switching transistor 601 is turned off in each of the first pixel 100a and the second pixel 100b.

Next, as shown at a time t23 in FIG. 11, one of the vertical shift registers 26 of the driving processor 22 changes the signal level of the selection control signal SEL supplied to the first pixel 100a from low to high. Accordingly, the selection transistor 902 is turned on in the first pixel 100a. A signal corresponding to the charge stored in the first charge storage 300 is then output from the amplification transistor 901 through the selection transistor 902 being on to the column signal line 101. After the lapse of a predetermined output time (i.e. the signal period) after the change in the signal level of the selection control signal SEL supplied to the first pixel 100a from low to high, the vertical shift register 26 of the driving processor 22 changes the signal level of the selection control signal SEL supplied to the first pixel 100a from high to low. Accordingly, the output of the signal from the first pixel 100a to the column signal line 101 stops once.

Next, as shown at a time t24 in FIG. 11, the pixel drive circuit 25 of the driving processor 22 changes the signal level of the third switching control signal SCT supplied to the first pixel 100a from low to high. Accordingly, the third switching transistor 701 is turned on in the first pixel 100a. In addition, the column signal line driver 102 brings the column signal line 101 connected to the first pixel 100a into the reset mode (i.e., where the reset voltage VRS is applied). Accordingly, the reset voltage VRS applied to the column signal line 101 is transmitted through the third switching transistor 701 being on of the first pixel 100a to the first charge storage 300 of the first pixel 100a. The intermediate potential VFD of the first pixel 100a is then reset. After completion of the reset of the intermediate potential VFD (e.g., after the lapse of a predetermined reset time), the pixel drive circuit 25 changes the signal level of the third switching control signal SCT supplied to the first pixel 100a from high to low. Accordingly, the third switching transistor 701 is turned off in the first pixel 100a. Then, the column signal line driver 102 brings the column signal line 101 connected to the first pixel 100a into the read mode (i.e., where the reader is connected).

Next, as shown at a time t25 in FIG. 11, the vertical shift register 26 of the driving processor 22 changes the signal level of the selection control signal SEL supplied to the first pixel 100a from low to high. Accordingly, in the first pixel 100a, the selection transistor 902 is turned on. A signal (i.e., a signal at a reset level) corresponding to the charge stored in the first charge storage 300 is then output from the amplification transistor 901 through the selection transistor 902 being on to the column signal line 101. After the lapse of a predetermined output time (i.e., the reset period) since the change in the signal level of the selection control signal SEL supplied to the first pixel 100a from low to high, the vertical shift register 26 changes the signal level of the selection control signal SEL supplied to the first pixel 100a from high to low.

In the example shown in FIG. 11, the signal period extends from the time t23 to the change in the signal level of the selection control signal SEL from high to low. The reset period extends from the time t25 to the change in the signal level of the selection control signal SEL from high to low. Each correlated double sampling circuit 27 samples, in the signal and reset periods, the signal levels of the signals that have been output from the output 900 of the first pixel 100a to the column signal line 101. The signals processed by the correlated double sampling circuit 27 are supplied through the associated horizontal shift register 28 and output circuit 29 to the information output 42 of the controller 40.

Next, as shown at a time t26 in FIG. 11, the vertical shift register 26 of the driving processor 22 changes the signal level of the selection control signal SEL supplied to the second pixel 100b from low to high. Accordingly, the selection transistor 902 is turned on in the second pixel 100b. A signal corresponding to the charge stored in the first charge storage 300 is then output from the amplification transistor 901 through the selection transistor 902 being on to the column signal line 101. After the lapse of a predetermined output time (i.e., the signal period) since the change in the signal level of the selection control signal SEL supplied to the second pixel 100b from low to high, the vertical shift register 26 of the driving processor 22 changes the signal level of the selection control signal SEL supplied to the second pixel 100b from high to low. Accordingly, the output of the signal from the second pixel 100b to the column signal line 101 stops once.

Next, as shown at a time t27 in FIG. 11, the pixel drive circuit 25 of the driving processor 22 changes the signal level of the third switching control signal SCT supplied to the second pixel 100b from low to high. Accordingly, the third switching transistor 701 is turned on in the second pixel 100b. In addition, the column signal line driver 102 brings the column signal line 101 connected to the second pixel 100b into the reset mode (i.e., where the reset voltage VRS is applied). Accordingly, the reset voltage VRS applied to the column signal line 101 is transmitted through the third switching transistor 701 being on of the second pixel 100b to the first charge storage 300 of the second pixel 100b. The intermediate potential VFD of the second pixel 100b is then reset. After completion of the reset of the intermediate potential VFD (e.g., after the lapse of a predetermined reset time), the pixel drive circuit 25 changes the signal level of the third switching control signal SCT supplied to the second pixel 100b from high to low. Accordingly, the third switching transistor 701 is turned off in the second pixel 100b. Then, the column signal line driver 102 brings the column signal line 101 connected to the second pixel 100b into the read mode (i.e., where the reader is connected).

Next, as shown at a time t28 in FIG. 11, the vertical shift register 26 of the driving processor 22 changes the signal level of the selection control signal SEL supplied to the second pixel 100b from low to high. Accordingly, the selection transistor 902 is turned on in the second pixel 100b. A signal corresponding to the charge stored in the first charge storage 300 (i.e., a signal at a reset level) is then output from the amplification transistor 901 through the selection transistor 902 being on to the column signal line 101. After the lapse of a predetermined output time (i.e., the reset period) since the change in the signal level of the selection control signal SEL supplied to the second pixel 100b from low to high, the vertical shift register 26 changes the signal level of the selection control signal SEL supplied to the second pixel 100b from high to low.

In the example shown in FIG. 11, the signal period extends from the time t26 to the change in the signal level of the selection control signal SEL from high to low. The reset period extends from the time t28 to the change in the signal level of the selection control signal SEL changes from high to low. Each correlated double sampling circuit 27 samples, in the signal and reset periods, the signal levels of the signals that have been output from the output 900 of the second pixel 100b to the column signal line 101. The signals processed by the correlated double sampling circuit 27 are supplied through the associated horizontal shift register 28 and output circuit 29 to the information output 42 of the controller 40.

As described above, in the output processing, in each of the H pixel row units, the signals are output from the group of the first pixels 100a belonging to the pixel row unit and the group of the second pixels 100b corresponding to the group of the first pixels 100a for each of the jmax distance detection periods. Jmax×2 count images are thus output to the information output of the controller 40. The count images are information including P×Q signal values each being a count value. The count value corresponds to the amount of charge stored in the second charge storage 500. In this example, the count value corresponds to the number of reflected light LL2 received by the light receiver 200 in the exposure mode. In this example, with an increase in the amount of charge stored in the second charge storage 500 (i.e., with an increase in the number of reflected light LL2 received by the light receiver 200 in the exposure mode), the count value increases.

[Operation of Information Output: Output of Distance Information]

Next, an operation of the information output 42 will be described. After completion of the distance detection processing by the driving controller 41, the information output 42 obtains N count images (i.e., information including P×Q signal values each being the count value) associated with the N (jmax×2 in this example) distance sections. Based on the N count images, the information output 42 generates distance images (i.e., three-dimensional information including the P×Q distance values each corresponding to the distance to the object) and outputs the generated distance images.

For example, the information output 42 performs comparison processing of each of the N count images. In the comparison processing of the K-th count image, the information output 42 determines, for each of the P×Q signal values (i.e., the count values) constituting the K-th count image, whether the signal value is equal to or greater than a threshold determined for the distance section K corresponding to the Kth count image. The threshold determined for each of the N distance sections is set to, for example, a signal value (i.e., the count value) obtained when the object is present in the distance section.

Based on the result of the comparison processing of each of the N count images, the information output 42 generates a distance image. For example, assume that one of the P×Q signal values (i.e., count values) constituting the K-th count image is equal to or greater than the threshold determined for the K-th count image. The one is at an X-th row, where X is an integer ranging from 1 to P, and in a Y-th column, where Y is an integer ranging from 1 to Q. In this case, the information output 42 sets the one of the P×Q distance values constituting the distance image in the X-th row and the Y-th column to the value associated with the distance section K.

Note that the information output 42 may adjust the threshold determined for each of the N distance sections in accordance with background light.

[Operation of Driving Controller: Imaging Control]

Next, the imaging control by the driving controller 41 will be described with reference to FIG. 12. In the imaging control, the driving processor 22 performs the imaging operation in response to the control by the driving controller 41.

<Step ST201>

First, in response to the control by the driving controller 41, the driving processor 22 drives each of the pixels 100 to reset the input potential VPD and the intermediate potential VFD.

<Step ST202>

Next, in response to the control by the driving controller 41, the driving processor 22 drives each of the pixels 100 to bring the light receiver 200 into the exposure mode only for a predetermined exposure time. Accordingly, the light receiver 200 shifts to the exposure mode and generates the charge corresponding to the light received by the light receiver 200. In accordance with the amount of the generated charge, the input potential VPD changes.

<Step ST203>

Next, in response to the control by the driving controller 41, the driving processor 22 drives each of the pixels 100 so that the first switch 400 transfers the charge generated by the light receiver 200 to the first charge storage 300. Accordingly, the charge is transferred from the light receiver 200 through the first switch 400 to the first charge storage 300. In accordance with the amount of the transferred charge, the intermediate potential VFD changes.

<Step ST204>

Next, in response to the control by the driving controller 41, the driving processor 22 drives each of the pixels 100 for each of the P pixel rows so that the output 900 outputs a signal corresponding to the charge stored in the first charge storage 300. Accordingly, the signal corresponding to the charge stored in the first charge storage 300 of the pixel 100 is supplied through the associated correlated double sampling circuit 27, the horizontal shift register 28, and the output circuit 29 to the controller 40. That is, the controller 40 is supplied with information (i.e., luminance images) including signal values each corresponding to luminance.

Advantages of Embodiment

As described above, at least one of the P pixel rows of the pixels 100 is designated. During the period, in the at least one of the Q pixel columns of the pixels 100, charge is generated by the light receiver 200 of the first pixel 100a of the P pixels constituting the pixel column and belonging to the designated pixel row. The charge is transferred not only to the second charge storage 500 of the first pixel 100*a* but also to the second charge storage 500 of the second pixel 100*b*. The second pixel is one of the P pixels 100 belonging to the pixel column and is connected together with the first pixel 100*a* to the column signal line 101. Specifically, in the first exposure and transfer operation, the charge can be transferred from the light receiver 200 of the first pixel 100*a* to the second charge storage 500 of the second pixel 100*b*. In the second exposure and transfer operation, the charge can be transferred from the light receiver 200 of the first pixel 100*a* to the second charge storage 500 of the first pixel 100*a*. This configuration makes it possible to improve the processing speed of the solid-state imaging device 20.

With an increase in the distance from the solid-state imaging device 20 to the target, the intensity of the reflected light LL2 coming back from the object to the solid-state imaging device 20 tends to decrease. That is, the intensity of the reflected light LL2 received by the light receiver 200 after the elapse of the second delay time TB, which is longer than the first delay time TA, since the emission of the signal light LL1 from the light source 30 tends to be lower than that after the elapse of the first delay time TA since the emission of the signal light LL1 from the light source 30. In addition, the transfer path (i.e., the path from the light receiver 200 of the first pixel 100*a* to the second charge storage 500 of the first pixel 100*a*) of the charge in the second exposure and transfer operation is shorter than that (i.e., the path from the light receiver 200 of the first pixel 100*a* to the second charge storage 500 of the second pixel 100*b*) in the first exposure and transfer operation. Accordingly, the second exposure and transfer operation causes less charge transfer loss than the first exposure and transfer operation. Therefore, in the continuous exposure and transfer operation, the first exposure and transfer operation is performed after the lapse of the first delay time TA since the emission of the signal light LL1 from the light source 30 and the second exposure and transfer operation is performed after the lapse of the second delay time TB since the emission of the signal light LL1 from the light source 30. At a relatively low intensity of the reflected light LL2 (i.e., after the lapse of the second delay time TB), the charge generated by the light receiver 200 of the first pixel 100*a* can be transferred utilizing the transfer path (i.e., the transfer path in the second exposure and transfer operation) which causes less charge transfer loss.

The light source 30 emits the signal light LL1 within the irradiation range in a line. This case increases the intensity of the signal light LL1 as compared to the case where the irradiation range of the signal light LL1 expands to irradiate the field corresponding all of the pixels 100. This configuration makes it possible to increase the distance measurable by the solid-state imaging system 10.

In this example, the column signal line driver 102 is provided which applies the reset voltage VRS to each of the column signal lines 101. Then, in each of the pixels 100, the third switch 700 connects the first charge storage 300 to the column signal line 101. The column signal line driver 102 then applies the reset voltage VRS to the column signal line 101 to reset the potential (i.e., the intermediate potential VFD) of the first charge storage 300. In each of the pixels 100, the fourth switch 800 connects the second charge storage 500 to the column signal line 101. The column signal line driver 102 then applies the reset voltage VRS to the column signal line 101 to reset the potential (i.e., the memory potential VMM) of the second charge storage 500. As described above, the column signal line driver 102 resets the intermediate potential VFD without requiring any additional configuration (e.g., a transistor) for resetting the intermediate potential VFD in each pixel 100. The driver also resets the memory potential VMM without requiring any additional configuration (e.g., a transistor) for resetting the memory potential VMM in each pixel 100. This configuration makes it possible to reduce the circuit scale of the pixels 100.

In this example, each of the pixels 100 includes the output 900. Then, the charge stored in the second charge storage 500 is transferred through the second switch 600 to the first charge storage 300. The output 900 outputs a signal corresponding to the charge stored in the first charge storage 300 to the column signal line 101 to output the signal corresponding to the charge stored in the second charge storage 500 to the column signal line 101.

(Solid-State Imaging Device According to Variation)

Figure 12:
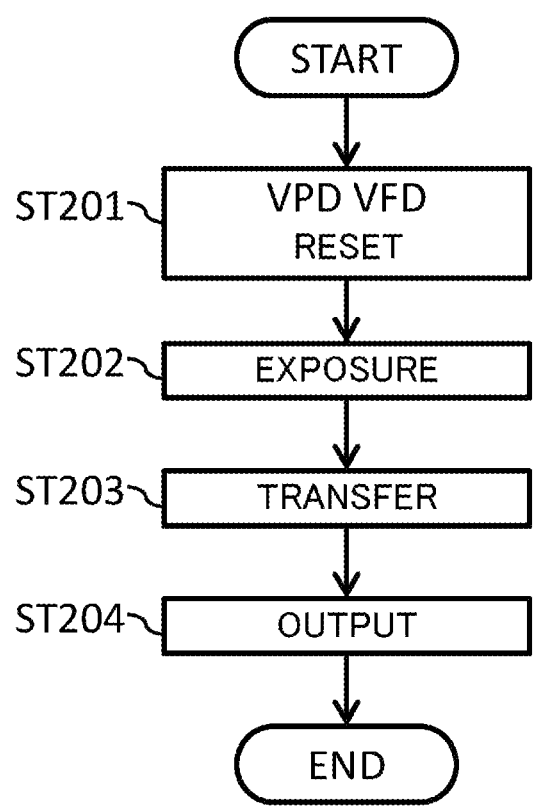
FIG. 12 is a flowchart for explaining imaging control.
Figure 13:
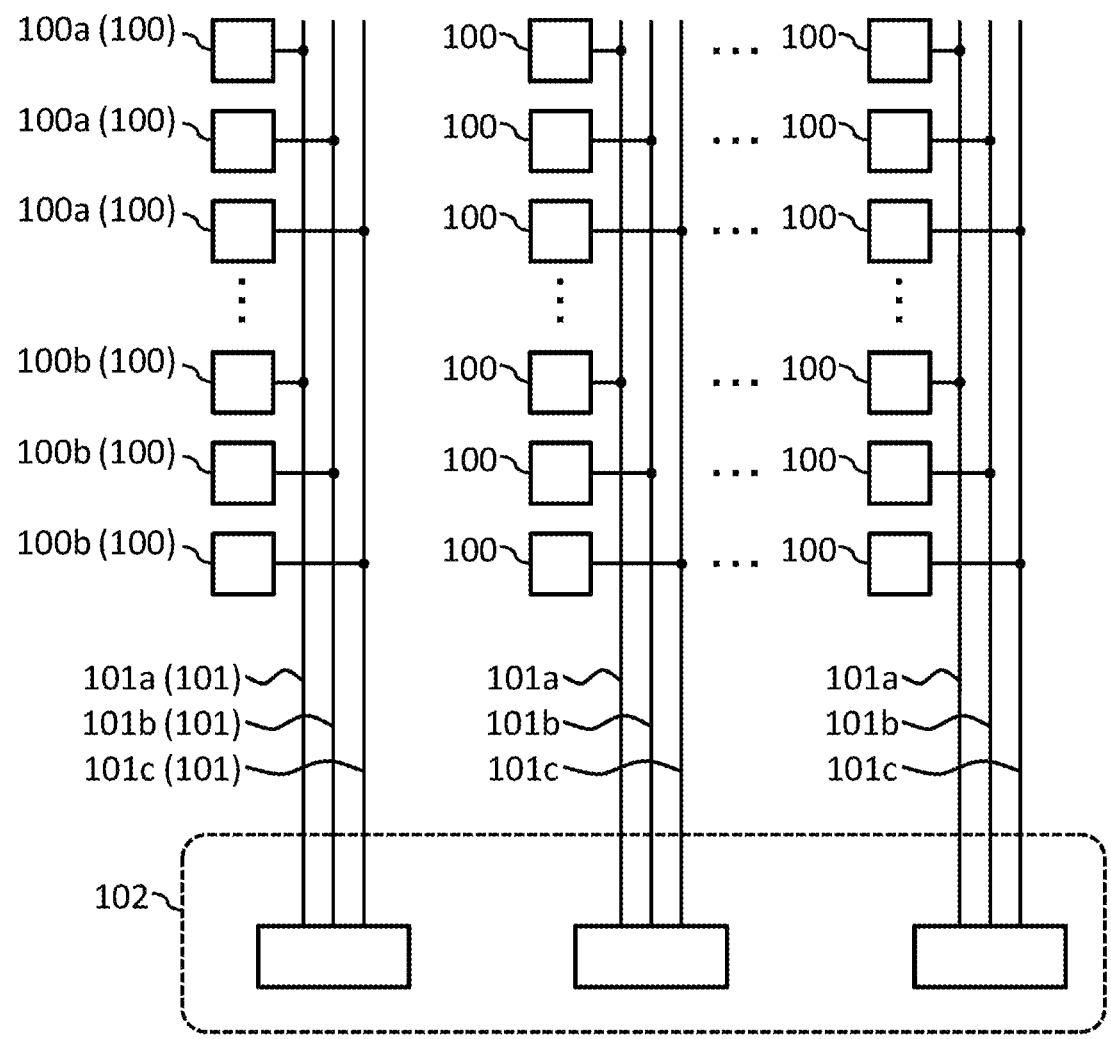
FIG. 13 is a block diagram illustrating a configuration of a main part of a solid-state imaging device according to a variation.

As shown in FIG. 12, each of the Q pixel columns of the pixels 100 may correspond to two or more of the column signal lines 101. In the example of FIG. 12, each of the Q pixel columns of the pixels 100 corresponds to three column signal lines (namely, first, second, and third column signal lines 101*a*, 101*b*, and 101*c*). Then, the pixel 100 in the 3Z−2 row, where Z is an integer ranging from 1 to P/3 and P is a multiple of 3 in this example, is connected to the first column signal line 101*a*. The pixel 100 in the 3Z−1 row is connected to the second column signal line 101*b*. The pixel 100 in the 3Z-th row is connected to the third column signal line 101*c*.

The solid-state imaging device 20 shown in FIG. 12 designates two or more of the P pixel rows of the pixels 100 simultaneously. Specifically, this examples simultaneous designation of three pixel rows (the 3Z−2, 3Z−1, and 3Z-th pixel rows). This configuration makes it possible to increase the processing speed of the solid-state imaging device 20.

(Distance Detection Control According to Variation)

Figure 15:
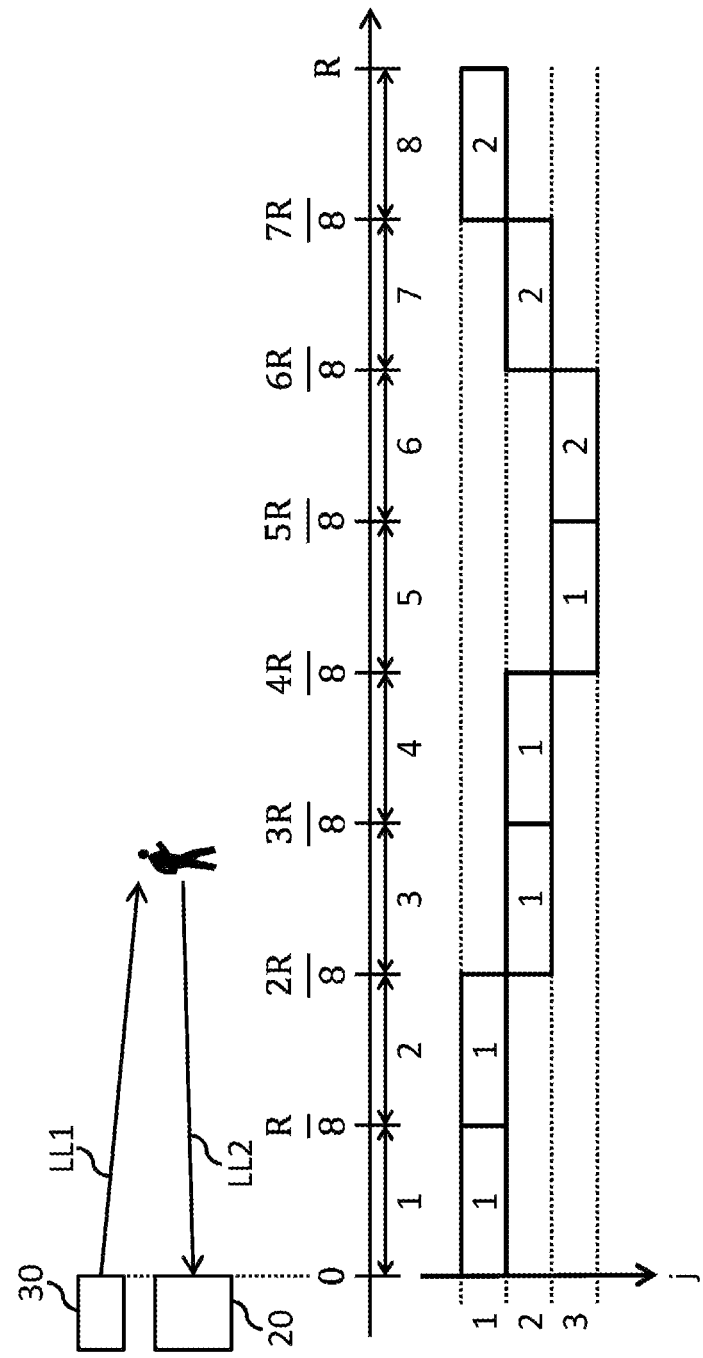
FIG. 15 is a conceptual diagram for explaining the distance detection control according to the variation.

As shown in FIGS. 14 and 15, the distance detection control for three or more distance sections may be performed in one distance detection period.

In the example of FIG. 14, in each of the first to third distance detection periods, the first distance section and the transfer destination (i.e., the transfer destination of charge) associated with the first exposure and transfer operation performed in response to the second signal light LL1 are different from those associated with the first exposure and transfer operation performed in response to the first signal light LL1. For example, the first row of the example of FIG. 14 indicates the following. The first signal light LL1 in the first distance detection period is subjected to the first exposure and transfer operation. The first distance section associated with the first exposure and transfer operation is set to the 1st distance section. The transfer destination of the charge in the first exposure and transfer operation is set to the second pixel. On the other hand, the second row of the example of FIG. 14 indicates the following. The second signal light LL1 in the first distance detection period is subjected to the first exposure and transfer operation. The first distance section associated with the first exposure and transfer operation is set to the 2nd distance section. The transfer destination of the charge in the first exposure and transfer operation is set to the third pixel. Note that the third pixel is one of the P pixels 100 belonging to the pixel column to which the first pixel 100*a* and the second pixel 100*b* belong and is connected together with the first pixel 100*a* and the second pixel 100*b* to the column signal line 101.

In the setting shown in the example of FIG. 14, the distance detection control is performed for three distance sections in each of three distance detection periods, namely, first to third distance detection periods, as shown in FIG. 15. For example, in the example of FIG. 14, in the first distance detection period, once the first signal light LL1 is emitted, the first exposure and transfer operation is performed which is associated with the 1st distance section (i.e., the section from 0 to R/8 in the example of FIG. 14), whereas the second exposure and transfer operation is performed which is associated with the distance section 8 (i.e., the section from 7R/8 to R in the example of FIG. 14). On the other hand, once the second signal light LL1 is emitted, the first exposure and transfer operation is performed associated with the 2nd distance section (i.e., the section from R/8 to 2R/8 in the example of FIG. 14), whereas the second exposure and transfer operation is performed which is associated with the distance section 8.

Other Embodiments

In the above description, the N distance sections may have the same length or different lengths.

The embodiment and variation described above may be combined and implemented as appropriate. The embodiment and variation described above are mere preferred examples in nature, and not intended to limit the scope, applications, or use of the disclosure.

As described above, the technology disclosed herein is useful as a solid-state imaging device, a solid-state imaging system, and a method of driving the solid-state imaging device.

What is claimed is:

1. A solid-state imaging device comprising:
pixels arranged in a matrix including P pixel rows and Q pixel columns; and
column signal lines each corresponding to one of Q pixel columns of the pixels and connected to two or more of P pixels belonging to the one of the Q pixel columns;
each of the pixels including:
a light receiver switchable between an exposure mode and a light-shielding mode and configured to generate charge corresponding to light received in the exposure mode;
a first charge storage configured to store the charge;
a first switch configured to switch connection and disconnection between the light receiver and the first charge storage;
a second charge storage configured to store the charge;
a second switch configured to switch connection and disconnection between the first charge storage and the second charge storage;
a third switch configured to switch connection and disconnection between the first charge storage and one of the column signal lines corresponding to the pixel; and
a fourth switch configured to switch connection and disconnection between the second charge storage and the one of the column signal lines corresponding to the pixel.

2. The solid-state imaging device of claim 1, wherein each of the Q pixel columns of the pixels corresponds to two or more of the column signal lines.

3. The solid-state imaging device of claim 1, wherein each of the pixels includes an output configured to output a signal corresponding to the charge stored in the first charge storage to one of the column signal lines corresponding to the pixel.

4. The solid-state imaging device of claim 1, further comprising:
a column signal line driver configured to apply a reset voltage to each of the column signal lines.

5. The solid-state imaging device of claim 1, further comprising:
a driving processor configured to drive the pixels, wherein the driving processor performs a photon counting operation of driving the pixels to designate at least one of the P pixel rows of the pixels and perform each of a first exposure and transfer operation and a second exposure and transfer operation at least once in at least one of the Q pixel columns of the pixels, and
in the first exposure and transfer operation, the light receiver of a first pixel, which is one of the P pixels belonging to the at least one of the Q pixel columns and belongs to the at least one of the P pixel rows designated, shifts to the exposure mode in the first exposure period; the charge generated by the light receiver of the first pixel is transferred through the first switch, the first charge storage, and the third switch of the first pixel to one of the column signal lines connected to the first pixel; and the charge transferred to the one of the column signal lines is further transferred through the fourth switch of a second pixel, which is one of the P pixels belonging to the at least one of the Q pixel columns and is connected together with the first pixel to the one of the column signal lines, to the second charge storage of the second pixel, and
in the second exposure and transfer operation, the light receiver of the first pixel shifts to the exposure mode in the second exposure period, and the charge generated by the light receiver of the first pixel is transferred through the first switch, the first charge storage, and the second switch of the first pixel to the second charge storage of the first pixel.

6. A solid-state imaging system comprising:
the solid-state imaging device of claim 5;
a light source configured to emit signal light; and
a controller configured to control an operation of the solid-state imaging device and an operation of the light source.

7. The solid-state imaging system of claim 6, wherein the controller performs distance detection control of controlling the operation of the solid-state imaging device and the operation of the light source such that at least one of the P pixel rows of the pixels is designated, the driving processor performs the photon counting operation in each of distance detection periods, and continuous exposure and transfer operation is performed at least once in the photon counting operation in each of the distance detection periods,
in the continuous exposure and transfer operation, the signal light is emitted from the light source, one of the first and second exposure and transfer operations is performed after a lapse of a first delay time, which corresponds to a first distance section, since emission of the signal light from the light source, and then the other of the first and second exposure and transfer operations is performed after a lapse of a second delay time, which corresponds to the second distance section, since the emission of the signal light from the light source, and
the second distance section is set farther from the solid-state imaging device than the first distance section is, and the second delay time is set longer than the first delay time.

8. The solid-state imaging system of claim 7, wherein in the continuous exposure and transfer operation, the signal light is emitted from the light source, the first exposure and transfer operation is performed after the lapse of the first delay time since the emission of the signal light from the light source, and then the second exposure and transfer operation is performed after the lapse of the second delay time since the emission of the signal light from the light source.

9. The solid-state imaging system of claim 7, wherein the light source emits the signal light within an irradiation range in a line extending in a row direction of the pixels and switches the irradiation range of the signal light in a column direction of the pixels, and the controller controls the operation of the light source so that a field corresponding to the at least one of the P pixel rows designated of the pixels falls within the irradiation range of the signal light.

10. A method of driving a solid-state imaging system, the system including:

pixels arranged in a matrix including P pixel rows and Q pixel columns; and column signal lines each corresponding to one of Q pixel columns of the pixels and connected to two or more of P pixels belonging to the one of the Q pixel columns; each of the pixels including: a light receiver switchable between an exposure mode and a light-shielding mode and configured to generate charge corresponding to light received in the exposure mode; a first charge storage configured to store the charge; a first switch configured to switch connection and disconnection between the light receiver and the first charge storage; a second charge storage configured to store the charge; a second switch configured to switch connection and disconnection between the first charge storage and the second charge storage; a third switch configured to switch connection and disconnection between the first charge storage and one of the column signal lines corresponding to the pixel; and a fourth switch configured to switch connection and disconnection between the second charge storage and the one of the column signal lines corresponding to the pixel, the method comprising:

designating at least one of the P pixel rows of the pixels;

performing, in at least one of the Q pixel columns of the pixels, first exposure and transfer of driving the pixels to bring the light receiver of a first pixel, which is one of the P pixels belonging to the at least one of the Q pixel columns and belongs to the at least one of the P pixel rows designated in the designating, into the exposure mode in the first exposure period, transfer the charge generated by the light receiver of the first pixel through the first switch, the first charge storage, and the third switch of the first pixel to one of the column signal lines connected to the first pixel, and further transfer the charge transferred to the one of the column signal lines through the fourth switch of a second pixel, which is one of the P pixels belonging to the at least one of the Q pixel columns and is connected together with the first pixel to the one of the column signal lines, to the second charge storage of the second pixel, and performing, in at least one of the Q pixel columns of the pixels, second exposure and transfer of driving the pixels to bring the light receiver of the first pixel into the exposure mode in the second exposure period and transfer the charge generated by the light receiver of the first pixel through the first switch, the first charge storage, and the second switch of the first pixel to the second charge storage of the first pixel.

* * * * *